US008302099B2

(12) United States Patent
Shpeisman et al.

(10) Patent No.: US 8,302,099 B2
(45) Date of Patent: *Oct. 30, 2012

(54) THREAD SYNCHRONIZATION METHODS AND APPARATUS FOR MANAGED RUN-TIME ENVIRONMENTS

(75) Inventors: Tatiana Shpeisman, Menlo Park, CA (US); Ali-Reza Adl-Tabatabai, Santa Clara, CA (US); Brian Murphy, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,591

(22) Filed: Mar. 5, 2012

(65) Prior Publication Data

US 2012/0167106 A1  Jun. 28, 2012

Related U.S. Application Data

(63) Continuation of application No. 12/559,254, filed on Sep. 14, 2009, now Pat. No. 8,136,112, which is a continuation of application No. 10/860,692, filed on Jun. 3, 2004, now Pat. No. 7,610,585.

(51) Int. Cl.
G06F 9/46 (2006.01)
G06F 12/00 (2006.01)
G06F 17/30 (2006.01)

(52) U.S. Cl. .............................. 718/102; 707/8; 710/200

(58) Field of Classification Search .................. None
See application file for complete search history.

(56) References Cited

U.S. PATENT DOCUMENTS

| | | | |
|---|---|---|---|
| 5,317,737 A | 5/1994 | Barton | |
| 6,052,695 A | 4/2000 | Abe et al. | |
| 6,330,714 B1 | 12/2001 | Hicks et al. | |
| 6,732,160 B2 | 5/2004 | Ambrosini et al. | |
| 6,735,760 B1 | 5/2004 | Dice | |
| 6,772,153 B1 | 8/2004 | Bacon et al. | |
| 6,792,601 B1 | 9/2004 | Dimpsey et al. | |
| 6,988,099 B2 | 1/2006 | Wiser et al. | |
| 7,035,870 B2 | 4/2006 | McGuire et al. | |
| 7,117,214 B2 | 10/2006 | Wiser et al. | |
| 7,552,428 B2 | 6/2009 | Stoodley et al. | |

(Continued)

OTHER PUBLICATIONS

Patent Cooperation Treaty, "International Search Report," issued in connection with PCT application No. PCT/US2004/026518, mailed Oct. 12, 2004 (4 pages).

(Continued)

Primary Examiner — Meng An
Assistant Examiner — Bing Zhao
(74) Attorney, Agent, or Firm — Hanley, Flight & Zimmerman, LLC

(57) ABSTRACT

A example method disclosed herein comprises initiating a first optimistically balanced synchronization to acquire a lock of an object, the first optimistically balanced synchronization comprising a first optimistically balanced acquisition and a first optimistically balanced release to be performed on the lock by a same thread and at a same nesting level, releasing the lock after execution of program code covered by the lock if a stored state of the first optimistically balanced release indicates that the first optimistically balanced release is still valid, the stored state of the first optimistically balanced release being initialized prior to execution of the program code to indicate that the first optimistically balanced release is valid, and throwing an exception after execution of the program code covered by the lock if the stored state of the first optimistically balanced release indicates that the first optimistically balanced release is no longer valid.

17 Claims, 15 Drawing Sheets

U.S. PATENT DOCUMENTS

| | | | |
|---|---|---|---|
| 7,567,963 | B2 | 7/2009 | Shpeisman et al. |
| 7,610,585 | B2 | 10/2009 | Shpeisman et al. |
| 2001/0014905 | A1 | 8/2001 | Onodera |
| 2003/0097360 | A1 | 5/2003 | McGuire et al. |
| 2003/0191757 | A1 | 10/2003 | Ambrosini et al. |
| 2005/0144170 | A1 | 6/2005 | Wiser et al. |
| 2005/0289546 | A1 | 12/2005 | Shpeisman et al. |
| 2010/0005467 | A1 | 1/2010 | Shpeisman et al. |

OTHER PUBLICATIONS

Patent Cooperation Treaty, "Written Opinion," issued in connection with PCT application No. PCT/US2004/026518, mailed Oct. 12, 2004 (5 pages).

Patent Cooperation Treaty, "International Preliminary Report on Patentability," issued in connection with PCT application No. PCT/US2004/026518, mailed Dec. 14, 2006 (7 pages).

United States Patent and Trademark Office, "Non-Final Office Action," issued in connection with U.S. Appl. No. 10/878,210, on Nov. 28, 2007 (21 pages).

United States Patent and Trademark Office, "Final Office Action," issued in connection with U.S. Appl. No. 10/878,210, on Jul. 9, 2008 (29 pages).

United States Patent and Trademark Office, "Advisory Action," issued in connection with U.S. Appl. No. 10/878,210, on Sep. 25, 2008 (3 pages).

United States Patent and Trademark Office, "Interview Summary," issued in connection with U.S. Appl. No. 10/878,210, on Oct. 14, 2008 (2 pages).

United States Patent and Trademark Office, "Non-Final Office Action," issued in connection with U.S. Appl. No. 10/860,692, on Nov. 25, 2008 (18 pages).

United States Patent and Trademark Office, "Notice of Allowance," issued in connection with U.S. Appl. No. 10/878,210, on Dec. 29, 2008 (12 pages).

United States Patent and Trademark Office, "Notice of Allowance," issued in connection with U.S. Appl. No. 10/860,692, on Jun. 16, 2009 (11 pages).

United States Patent and Trademark Office, "Notice of Allowance," issued in connection with U.S. Appl. No. 12/559,254, on Nov. 7, 2011 (21 pages).

Bacon et al., "Thin Locks: Featherweight Synchronization for Java," pp. 258-268, Conference on Programming Language Design and Implementation, Proceedings of the ACM SIGPLAN 1998 conference on Programming language design and implementation, held in Montreal, Canada, in May 1998 (11 pages).

Croi et al., "Escape Analysis for Java," pp. 1-19, vol. 34, Issue 10, ACM SIGPLAN Conference on Object-Oriented Programming Systems, Languages, and Applications, held in Denver, United States, on Nov. 1, 1999 (19 pages).

Kawachiya et al., "Lock Reservation: Java Locks Can Mostly Do Without Atomic Operations," pp. 130-141, vol. 37, Issue 11, ACM SIGPLAN Notices, held in Seattle, United States, on Nov. 4-8, 2002 (12 pages).

Mason, Kenneth, "Fast Recursive Locking in," vol. 433, No. 103, Research Disclosure, International Business Machines Corporation, May 2000 (1 page).

US 8,302,099 B2

THREAD SYNCHRONIZATION METHODS AND APPARATUS FOR MANAGED RUN-TIME ENVIRONMENTS

RELATED APPLICATIONS

This patent is a continuation of U.S. application Ser. No. 12/559,254, now U.S. Pat. No. 8,136,112, entitled "Thread Synchronization Via Selective Modification of Stored States of Pending Optimistically Balanced Lock Releases Having Previous Lock Owner and Validity Flag" and filed on Sep. 14, 2009, which is a continuation of U.S. application Ser. No. 10/860,692, now U.S. Pat. No. 7,610,585, entitled "Thread Synchronization Methods and Apparatus for Managed Run-time Environments" and filed on Jun. 3, 2004. U.S. application Ser. Nos. 12/559,254 and 10/860,692 are hereby incorporated by reference in their respective entireties.

FIELD OF THE DISCLOSURE

This disclosure relates generally to computers and, more particularly, to thread synchronization methods and apparatus for managed run-time environments.

BACKGROUND

Software environments that support multithreaded applications, for example, JAVA and the European Computer Manufacturers Association (ECMA) Common Language Infrastructure (CLI), typically include a synchronization mechanism for coordinating when one or more threads may access an object. As will be appreciated by those of ordinary skill in the art, a thread refers to a series of processor instructions organized into a single control flow of execution for processing one or more objects. An object is an instance of a class, where a class is a collection of data and methods to operate on such data. In the case of multiple threads of execution, care must be taken to prevent the multiple threads from modifying the same object simultaneously in a way that might place the object in an erroneous state. In particular, a thread may have critical sections that operate on objects that could be accessed simultaneously by another thread. Thus, multi-threaded systems typically provide specialized statements to protect the operation of a critical section from being corrupted by one or more other threads accessing such a shared object during critical section execution.

For example, JAVA source code may include a synchronized statement to protect objects from being accessed simultaneously by different threads. Use of the synchronized statement enables acquisition of an exclusive lock of an object identified by the synchronized statement. Thus, a thread may be prevented from executing a critical section of code until it can obtain an exclusive lock on a particular object identified by a synchronized statement. Moreover, once such a lock is obtained, no other thread can access the locked object, thereby preventing inadvertent corruption of the processing being performed during execution of a critical section of code. Such a locking procedure may be used to ensure that multiple threads cannot access shared objects in a manner that could cause conflicting execution of critical sections of code at the same time. Of course, application of the synchronized statement is generally used in cases where a particular program creates multiple threads to share objects and/or methods. If only one thread ever accesses a particular object and/or method, there is no need to protect it with a synchronized statement.

A synchronized statement in JAVA source code is normally converted to JAVA virtual machine (JVM) instructions, because, as is known in the art, JAVA source code is first compiled into bytecodes (i.e., JVM language) prior to being executed by the JVM. For example, a synchronized statement may be converted to a monitorenter JVM instruction to gain/acquire an exclusive lock on an object. As a compliment to the monitorenter instruction, a monitorexit JVM instruction is provided to unlock/release the exclusive lock on the object. Accordingly, if a thread successfully executes the monitorenter instruction upon an object, that thread gains temporary exclusive lock ownership of the object (i.e., it has gained a lock on the object to prevent other threads from accessing the critical sections of code). If another thread, or second thread, attempts to execute the monitorenter instruction upon the same object while the first thread has temporary exclusive ownership of the object, the second thread must wait (e.g., sleep or spin) until the first thread (i.e., the current lock owner) executes the monitorexit instruction to release its exclusive lock of the object.

Two state variables are typically used to describe the lock state of an object. The first state variable is a lock owner that corresponds to the thread identifier of the thread that currently owns the lock. The lock owner may be set to a NULL value or a NULL thread for the case in which the lock is not owned by any thread. The second state variable is a lock recursion counter that may be used to indicate the number of times that the lock owner has acquired the lock (to support recursive locking) Typically, the lock state of an object is initialized to have a lock owner equal to a NULL value (corresponding to an unlocked state) and a lock recursion counter equal to zero.

In many prior-art object locking techniques (e.g., prior art implementations of the JVM monitorenter and monitorexit instructions), the lock release function (e.g., corresponding to monitorexit instruction) determines whether a thread attempting to release the lock is actually the lock owner of the lock. Additionally, the lock release function checks the lock recursion counter to determine whether the lock should be unlocked or maintained (e.g., maintained in the locked state due to multiple recursive lock acquisitions). However, most well-formed applications that are written using a higher-level language (e.g., JAVA) and then compiled to bytecodes include matched pairs of lock acquisition and release operations (e.g., matched pairs of monitorenter and monitorexit JVM instructions) and, therefore, exhibit balanced synchronization characteristics (i.e., a locking sequence involving a balanced lock acquisition and release pair performed by the same thread). In code exhibiting balanced synchronization characteristics, the additional overhead of checking the lock owner and the lock recursion counter state variables may be unnecessary and, therefore, may reduce the overall efficiency of the executing application.

DETAILED DESCRIPTION

Figure 1:
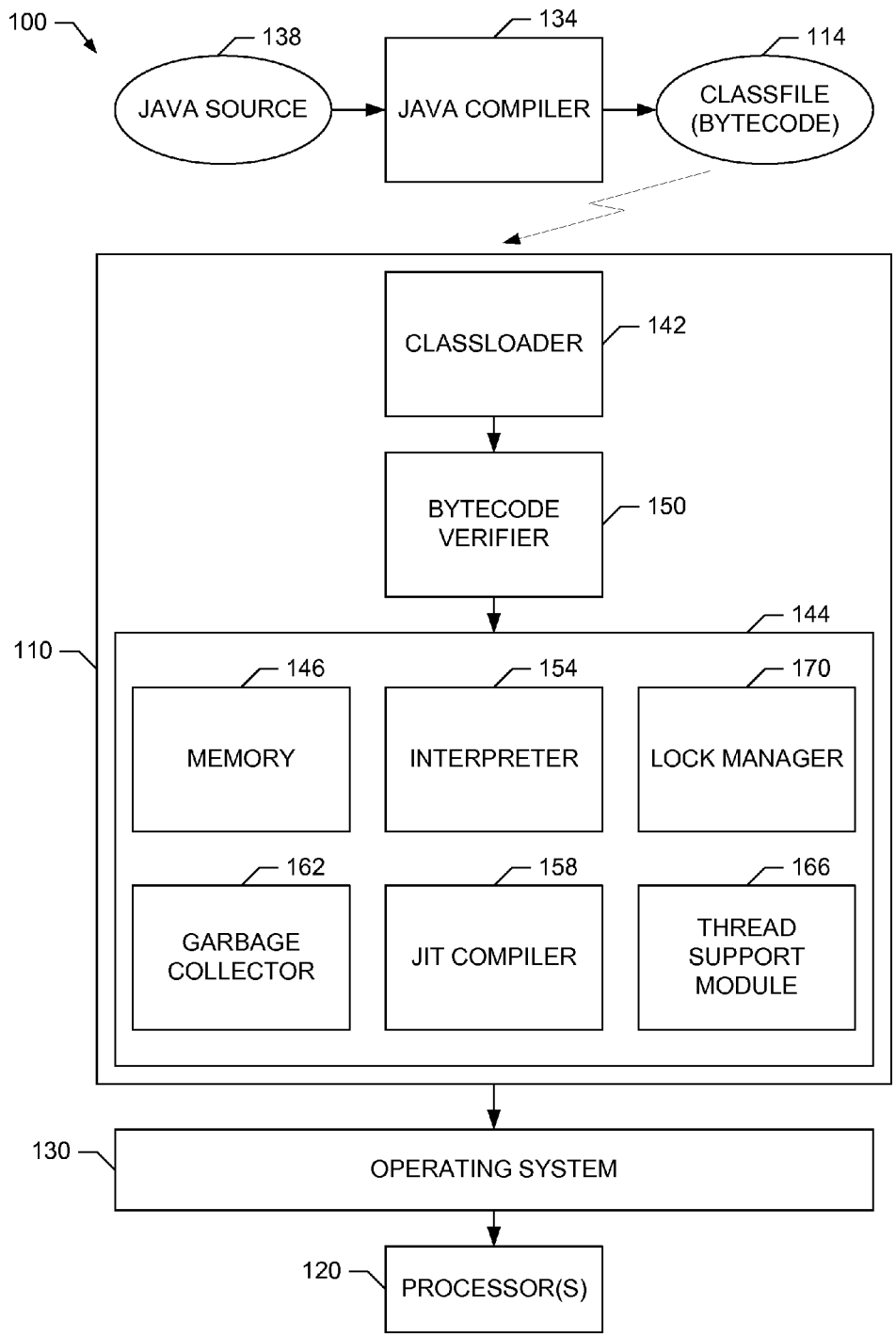
FIG. 1 is a block diagram of an example managed run-time environment in which the example methods, apparatus and articles of manufacture described herein may be employed.

A block diagram of an example environment of use 100 in which the example methods, apparatus and articles of manufacture described herein may be employed is illustrated in FIG. 1. The example environment of use 100 may be implemented, for example, via one or more processor systems such as the example processor system 1100 of FIG. 11 described below. While the example of FIG. 1 corresponds to a JAVA-based managed run-time environment (MRTE), one having ordinary skill in the art will appreciate that the example methods, apparatus and articles of manufacture described herein may be applied to any similar MRTE environment of use, such as, for example, CLI and the associated language C#.

The example environment of use 100 includes an MRTE depicted as a JAVA virtual machine (JVM) 110 in FIG. 1. The example JVM 110 dynamically converts a program represented by machine-independent instructions, or bytecodes 114, into machine-dependent, or native, instructions and then executes the native instructions on one or more processors 120 (such as the processor 1112 discussed below). The JVM 110 may execute the native instructions via an operating system (OS) 130 specific to the one or more processors 120, such as the Microsoft Windows OS, the UNIX OS, the Linux OS, etc.

In the example of FIG. 1, the JVM 110 processes bytecodes 114 that are stored in a plurality of classfiles 114. Typically, a classfile 114 stores bytecodes 114 corresponding to a single JAVA class, including the interfaces, fields and methods that define the class. A classfile 114 may be created by a JAVA compiler 134 from JAVA program source code 138 written, for example, by a software developer. The JAVA compiler 134, the associated JAVA source code 138 and the resulting classfiles 114 (or bytecode 114) are well-known in the art and are not discussed further herein.

To process a classfile 114, the example JVM 110 includes a classloader 142 to locate one or more specific classfiles 114 corresponding to one or more specific classes and to load such classfiles 114 into an execution engine 144 of the JVM 110, for example, by storing a local image of a loaded classfile 114 into a local memory 146. Prior to storing the loaded classfile 114 to memory 146, the classloader 142 may invoke a bytecode verifier 150 to verify that the structure of the loaded classfile 114 is correct and conforms to the constructs of the JAVA language. In either case, the execution engine 144 of the JVM 110 then converts the loaded, machine-independent JVM 110 then converts the loaded, machine-independent bytecodes into machine-dependent instructions using, for example, an interpreter 154 and/or one or more Just-In-Time (JIT) compilers 158.

The interpreter 154 converts the bytecode 114 into a set of machine-dependent instructions that implement the functionality of the bytecode 114 on the target processor(s) 120. In other words, the interpreter 154 provides an emulation layer to allow a bytecode 114 to be executed on the target processor(s) 120 as if the processor(s) 120 directly supported the JAVA instruction set. On the other hand, the JIT compiler 158 compiles a set of bytecodes 114 into a set of machine-dependent instructions for execution on the target processor(s) 120. The specific functionality of an individual bytecode 114 may not be exactly translated into machine-dependent instructions, but the overall functionality of the resulting set of machine-dependent instructions will be equivalent to the original set of bytecodes 114. Thus, the JIT compiler 158 may produce more optimal code than the interpreter 154. However, the interpreter 154 may be easier to implement than the JIT compiler 158.

To execute program code provided by the interpreter 154 and/or one or more JIT compilers 158, the execution engine 144 of the JVM 110 may define one or more storage areas in the local memory 146. For example, to support the execution of multiple, simultaneous threads, the JVM 110 may allocate a separate virtual program counter (pc) register and a separate JVM stack frame for each thread in the memory 146. The JVM stack frame may be used to store, for example, local variables and partial results corresponding to the associated execution thread. Additionally, the JVM 110 may define storage areas in the local memory 146 common to all threads. For example, such storage areas may include a heap to store objects that are created during program execution, a method area to store, for example, data and code used to implement the methods for a particular class, and a runtime constant pool to store constants associated with a particular class. To manage the runtime portion of the memory 146 efficiently, the JVM 110 may include a garbage collector 162, for example, to automatically deallocate objects from the heap to free memory for subsequent program execution.

To support the execution of multiple simultaneous threads, the execution engine 144 of the JVM 110 includes a thread support module 166. The thread support module 166 supports the creation of a thread by creating a thread object and executing the thread by invoking a start method of the thread. Additionally, the thread support module 166 may support preferential execution of threads through the use of various priority levels. Of particular interest in this disclosure, the execution engine 144 of the JVM 110 also includes a lock manager 170 to resolve conflicts that may occur as two or more threads attempt to access a same shared object.

The industry-standard specification corresponding to the example JVM 110 (as well as specifications for other managed run-time environments) defines procedures to support synchronization of objects between multiple threads. The JVM 110 provides a synchronization lock for each object. A thread may acquire ownership of an object by acquiring ownership of the lock associated with the object. Similarly, the thread may release ownership of the object by releasing ownership of the lock associated with the object. In the JAVA programming language, synchronization of objects and methods is implemented through the synchronized statement. The specification for the JVM 110 defines the lock acquisition and release operations via the monitorenter and monitorexit bytecodes, respectively. However, the implementation of the monitorenter and monitorexit bytecodes is not defined.

Figure 2:
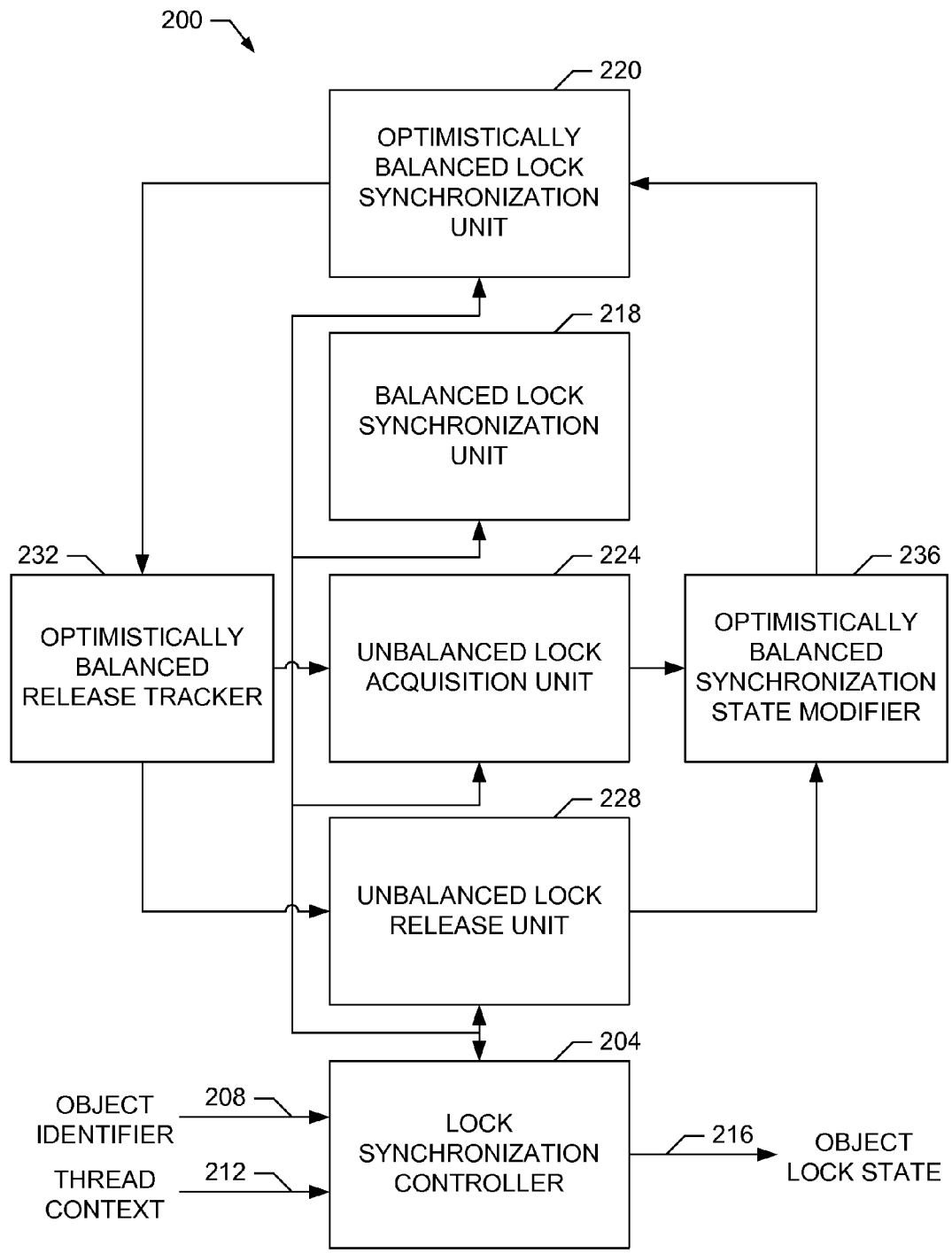
FIG. 2 is a block diagram of an example lock manager that may be used in the managed run-time environment of FIG. 1.

A block diagram of an example lock manager 200 that may be used to implement the example lock manager 170 of FIG. 1 is shown in FIG. 2. The example lock manager 200 acquires and releases a lock of an object for a thread based on a presumption that the majority of lock acquire and lock release will be balanced or optimistically balanced. For example, the lock manager 200 may determine that a set of acquire and release operations on a lock are balanced if such operations occur at the same nesting level and that the critical section of code that lies between the operations contains either no synchronization operations or only other balanced synchronization operations on the lock (e.g., the thread acquires the lock of the object, executes a critical section of program code and then releases the lock of the object). Similarly, the lock manager 200 may determine that a set of acquire and release operations on a lock are optimistically balanced if such operations occur at the same nesting level but the lock manager 200 cannot ascertain with certainty that all the operations are balanced (e.g., in cases in which the critical section of code contains method calls). Most well-formed programs that are written using a higher-level language (e.g., JAVA) and then compiled to bytecodes (e.g., bytecodes 114) exhibit balanced synchronization characteristics (i.e., synchronization that includes a balanced acquire and release pair as mentioned previously). In rare cases, however, a lock acquisition or release may not be balanced (e.g., as may be the case for programs implemented using manually written bytecodes). Accordingly, in addition to the balanced and optimistically balanced lock processing procedures, the lock manager 200 may employ unbalanced acquisition and release procedures to acquire and release the lock of the object, respectively.

As shown in FIG. 2, the lock manager 200 includes a lock synchronization controller 204 that accepts an object identifier input 208 and a thread context input 212 from an executing thread. The object identifier input 208 is used to identify an object to be synchronized and may include a unique object instance identifier, a lockword for the object, etc. The thread context input 212 is used to indicate the identity of a thread seeking to lock or unlock the object identified by the object identifier input 208, the operating state of the thread and the associated operation to perform on the lock of the object (e.g., to acquire the lock or release the lock and whether the acquire and/or release are balanced, optimistically balanced or unbalanced). The lock synchronization controller 204 provides an object lock state output 216 to indicate the state of the lock of the object (e.g., initially acquired, recursively acquired, released/unlocked, throw exception, etc.).

Additionally, the lock synchronization controller 204 invokes a particular lock operation unit based on the type of locking operation to be performed on the lock of the object identified by the object identifier input 208. Example types of locking operations include a balanced lock synchronization, an optimistically balanced lock synchronization, an unbalanced lock acquisition and an unbalanced lock release. The lock synchronization controller 204 may determine the type of locking operation based on information provided via the thread context input 212. Such information may be determined, for example, by the interpreter 154 and/or JIT compiler 158 of FIG. 1 as part of the conversion from the bytecode 114 to the set of machine-dependent instruction being executed by the thread identified by the thread context input 212.

To perform a balanced lock synchronization of an object (i.e., a balanced lock acquisition followed by a corresponding balanced lock release), the example lock manager 200 includes a balanced lock synchronization unit 218. If the lock synchronization controller 204 determines that a balanced synchronization should be performed on the object (e.g., based on the object identifier input 208 and the thread context input 212), then the balanced lock synchronization unit 218 determines whether a thread already has acquired the lock of the object. If the lock of the desired object is available (or already owned by the requesting thread), then the balanced lock synchronization unit 218 stores the current state of the lock and acquires the lock for the thread. If the lock is not available, the balanced lock synchronization unit 218 invokes a known lock contention procedure to obtain the lock for the thread after it becomes available (with the constraint that the known lock contention procedure does not alter the representation/format of the lock or returns the lock to its original representation/format after the contention process terminates). In either case, the balanced lock synchronization unit 218 may then cause the lock synchronization controller 204 to update the lock state output 216 to indicate that the object lock has been acquired. After the thread finishes executing code that required the locked object (e.g., as indicated by the thread context input 212), the balanced lock synchronization unit 218 may be signaled to release the lock of the object by restoring the lock to its previous state, thereby causing the lock synchronization controller 204 to update the object lock state output 216 accordingly.

To perform an optimistically balanced lock synchronization of an object, the example lock manager 200 includes an optimistically balanced lock synchronization unit 220. The optimistically balanced lock synchronization unit 220 operates in a manner similar to the balanced lock synchronization unit 218. As described below in connection with FIG. 5B, the optimistically balanced lock synchronization unit 220 employs a fallback mechanism to recover from an unbalanced lock acquisition and/or release that may occur after an optimistically balanced lock acquisition is performed. An example fallback mechanism may be based on a flag or other indicator to indicate whether an unbalanced lock operation occurred after an optimistically balanced lock acquisition but before a corresponding optimistically balanced lock release (i.e., while the optimistically balanced lock acquisition is active). Such a flag or other indicator allows the optimistically balanced lock synchronization unit 220 to modify the corresponding optimistically balanced release operation accordingly. To support recursive lock acquisitions by a single thread, the optimistically balanced lock synchronization unit 220 includes a synchronization map to track the state of all pending optimistically balanced lock releases for a given object.

To perform an unbalanced lock acquisition or an unbalanced lock release, the lock manager 200 includes an unbalanced lock acquisition unit 224 and an unbalanced lock release unit 228, respectively. If the lock synchronization controller 204 determines that an unbalanced lock acquisition should be performed on the object (e.g., based on the thread context input 212), the unbalanced lock acquisition unit 224 acquires the lock of the object for the thread if the lock is available (or already owned by the thread) or invokes a known lock contention procedure if the lock is unavailable (with the constraint that the known lock contention procedure does not alter the representation/format of the lock or returns the lock to its original representation/format after the contention process terminates). If the lock synchronization controller 204 determines that an unbalanced release should be performed on the object, then the unbalanced lock release unit 228 releases/unlocks the lock of the object if the lock is currently owned by the thread. If the lock is not owned by the thread, then the unbalanced lock release unit 228 throws an exception indicating that an invalid lock release was attempted. Then, depending on whether a lock acquisition or a lock release was performed, the unbalanced lock acquisition unit 224 or the unbalanced lock release unit 228, respectively, may cause the lock synchronization controller 204 to update the lock state output 216 to indicate the appropriate state of the object lock.

Both the unbalanced lock acquisition unit 224 and the unbalanced lock release unit 228 may need to modify the synchronization map of pending releases stored by the optimistically balanced lock synchronization unit 220. For example, an unbalanced lock acquisition performed after an optimistically balanced lock acquisition may require that the subsequent optimistically balanced release actually maintain the lock (due to the extra lock acquisition). In another example, an unbalanced lock release performed after an optimistically balanced lock acquisition, but before the subsequent optimistically balanced lock release, may require that the optimistically balanced lock release throw an exception rather than release the lock (due to the extra lock release performed on the lock after it has already been released by the unbalanced lock release). Thus, to update the synchronization map maintained by the optimistically balanced lock synchronization unit 220, the example lock manager 200 includes an optimistically balanced synchronization state modifier 236. The optimistically balanced synchronization state modifier 236 may be configured to modify the state of a pending optimistically balanced release to a valid state (e.g., an unlock state or a maintain lock state) or an invalid state (e.g., an invalid release/throw exception state). The optimistically balanced synchronization state modifier 236 may be invoked by either the unbalanced lock acquisition unit 224 or the unbalanced lock release unit 228 depending on the lock operation being performed (i.e., unbalanced acquisition or unbalanced release, respectively) and the history of preceding unbalanced lock operations. For example, an unbalanced lock release may be coupled with an unbalanced lock acquisition such that an optimistically balance release in the synchronization map may not need to be modified.

The example lock manager 200 also includes an optimistically balanced release tracker 232 to process the synchronization map stored by the optimistically balanced lock synchronization unit 220. The optimistically balanced release tracker 232 may be configured, for example, to determine the number of valid optimistically balanced releases stored in the synchronization map (e.g., releases corresponding to unlocking the lock or maintaining the lock in the case of a recursive lock acquisition). The optimistically balanced release tracker 232 may also determine the presence of any invalid optimistically balanced releases stored in the synchronization map (e.g., balanced releases corresponding to an invalid (extra) release that will cause an exception to be thrown). The optimistically balanced release tracker 232 provides these statistics concerning the synchronization map to the unbalanced lock acquisition unit 224 and/or the unbalanced lock release unit 228 so that they may properly invoke the optimistically balanced synchronization state modifier 236.

Figure 3A:
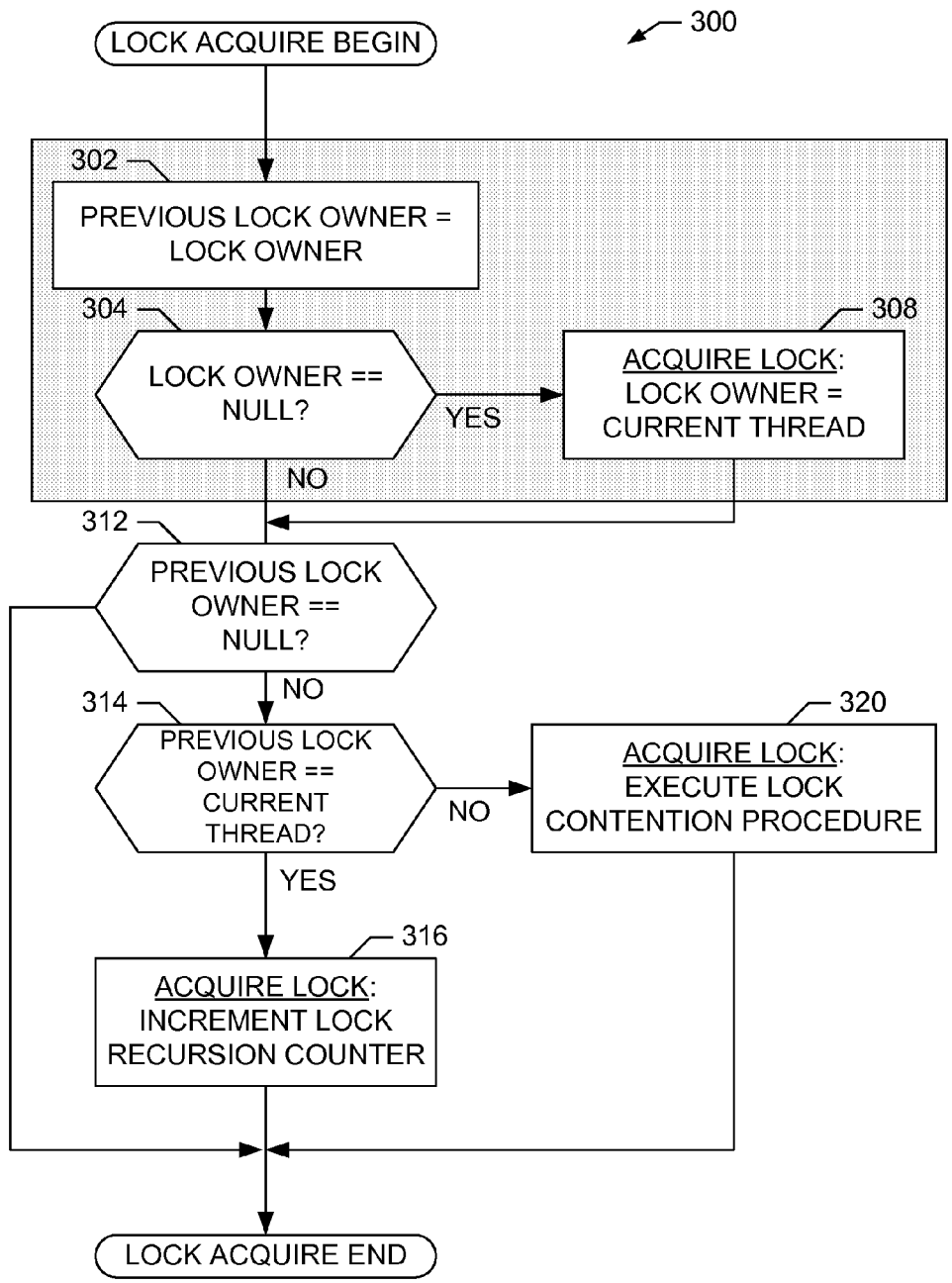
FIGS. 3A-3B are flowcharts representative of example machine readable instructions that may be executed by a machine to implement an example prior-art lock manager that may be used in the managed run-time environment of FIG. 1.
Figure 3B:
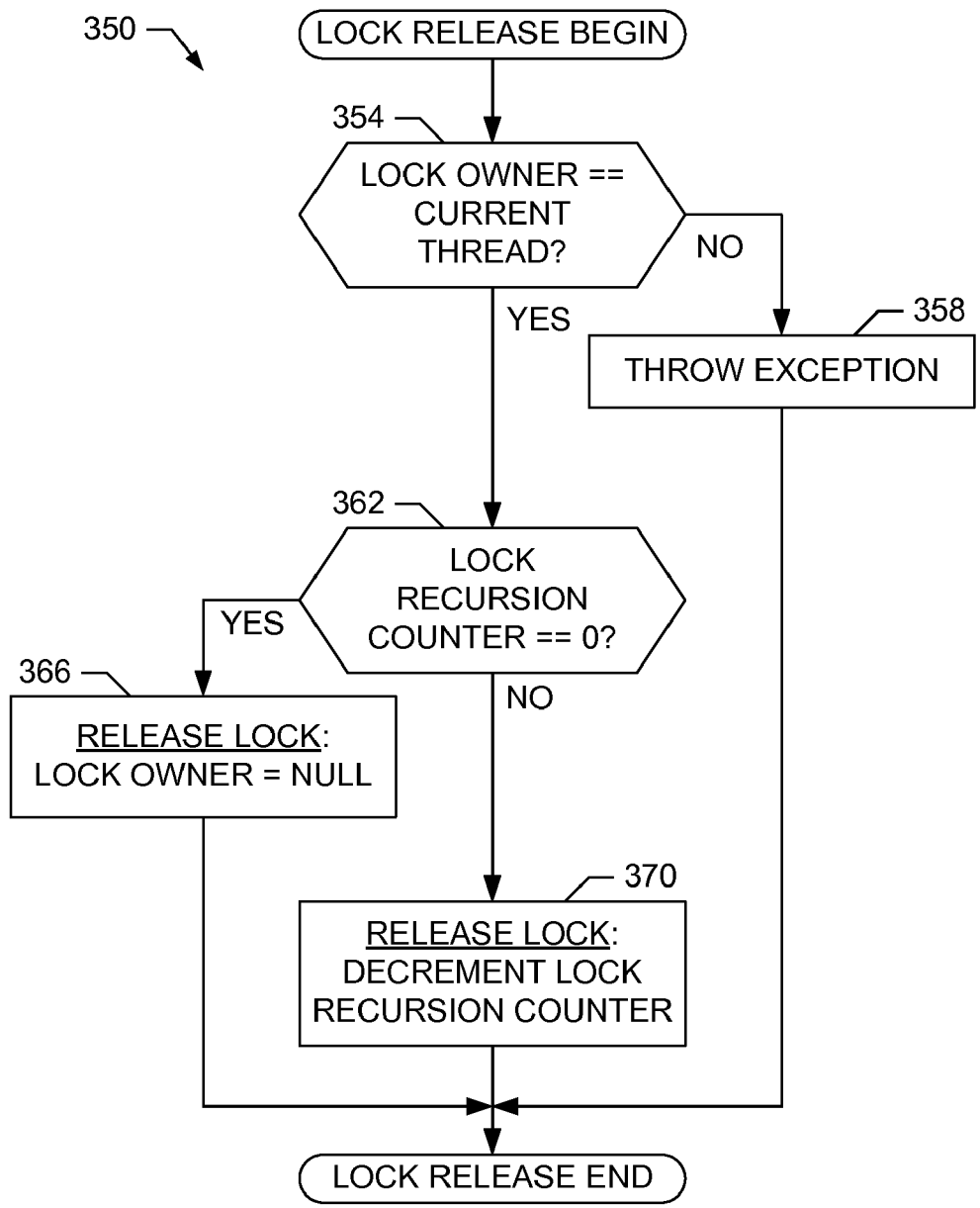

Flowcharts representative of known machine readable instructions for implementing the lock manager 170 of FIG. 1 are shown in FIGS. 3A-3B. Flowcharts representative of example disclosed machine readable instructions for implementing the lock manager 170 of FIG. 1 and/or the lock manager 200 of FIG. 2 are shown in FIGS. 4-9. In the examples of FIGS. 4-9, the processes represented by each flowchart may be implemented by a set of machine readable instructions that may comprise one or more programs for execution by a processor, such as the processor 1112 shown in the example computer 1100 discussed below in connection with FIG. 11. The one or more programs may be embodied in software stored on a tangible medium such as a CD-ROM, a floppy disk, a hard drive, a DVD, or a memory associated with the processor 1112. However, persons of ordinary skill in the art will readily appreciate that the entire program and/or portions thereof could alternatively be executed by a device other than the processor 1112 and/or embodied in firmware or dedicated hardware in a well-known manner. For example, the lock manager 170 and/or the lock manager 200 could be implemented by any combination of software, hardware, and/or firmware. Further, although the example programs are described with reference to the flowcharts illustrated in FIGS. 4-9, persons of ordinary skill in the art will readily appreciate that many other methods of implementing the example methods and apparatus described herein may alternatively be used. For example, with reference to the flowcharts illustrated in FIGS. 4-9, the order of execution of the blocks may be changed, and/or some of the blocks described may be changed, eliminated, combined and/or subdivided into multiple blocks.

To better appreciate the properties and characteristics of the example lock manager 200 of FIG. 2, and to better understand the operation of the various processes illustrated by the flowcharts of FIGS. 4-9 below, an example prior-art process to implement the lock manager 170 of FIG. 1 is shown in FIGS. 3A-3B. Specifically, FIG. 3A illustrates an example prior-art process 300 to acquire a lock of an object and FIG. 3B illustrates an example prior-art process 350 to release a lock of the object. Although not shown, a controlling process may be used to determine which of the lock acquisition and lock release procedures should be invoked based on the state of an executing program thread.

Turning to FIG. 3A, the example prior-art lock acquisition process 300 begins by setting a variable/register corresponding to the previous lock owner of a lock associated with an object to be locked equal to the present lock owner of the lock (block 302). The process 300 then attempts to lock the object for a current thread (i.e., the thread requesting the lock) by first determining whether any thread already owns the lock of the object to be locked (i.e., whether a lock owner exists for the object or whether the lock owner is set to a NULL value) (block 304). If the process 300 determines that no thread owner exists (block 304) and, thus, that the lock of the object is unlocked, then process 300 acquires the lock for the thread by setting the lock owner to a value representative of the thread (e.g., a unique thread identifier value) (block 308). If, however, the process 300 determines that a lock owner already exists (block 304) then the process 300 leaves the lock owner unchanged. To prevent a second thread from attempting to acquire the lock while a first thread is already in the process of becoming the lock owner, blocks 302, 304 and 308 are typically implemented using a single atomic operation (such as a cmpxchg instruction on a processor belonging to the Intel Itanium processor family). An atomic operation provides a thread (and/or a processor in a multi-processor system) with exclusive access to shared memory during the execution of the atomic operation. Thus, no other thread can modify the memory locations accessed by the atomic operation during its execution.

After it is determined that either the lock owner is not NULL (block 304) or the lock owner is defined to be the current thread (block 308), the process 300 determines whether the previous lock owner of the object is a NULL value (corresponding to the case in which the current thread has acquired the lock at block 308) (block 312). If the previous lock owner is a NULL value (block 312), then the example process 300 ends. If, however, the process 300 determines that the previous lock owner is not a NULL value (block 312), then the process determines whether the previous lock owner is the current thread (corresponding to the case in which the current thread has already previously acquired the lock) (block 314). If the previous lock owner is the current thread (block 314), then the process 300 may, for example, increment a lock recursion counter associated with the lock to indicate that the current thread has acquired the object lock multiple times (block 316). The example process 300 then ends.

If, however, the process 300 determines that the previous lock owner is not the current thread (block 314) and, thus, that another thread already owns the lock, then the process 300 invokes a known lock contention procedure to allow the current thread to acquire the lock after the present lock owner releases the lock (block 320). For example, the process 300 may cause the current thread to spin in an execution loop or halt execution until the present lock owner releases/unlocks the lock of the object. After the lock of the object becomes available, the process 300 may then acquire the lock for the current thread and the example process 300 then ends.

Turning to FIG. 3B, the example prior-art lock release process 350 begins by attempting to release an object for the current thread (i.e., the thread requesting the release) by first determining whether the current thread is the lock owner of the object (block 354). If the current thread is not the lock owner and, thus, another thread presently owns the lock (block 354), then the process 350 throws an exception (block 358). At block 358, the process 350 may use any known exception handling technique to throw an exception indicating that an invalid release attempt was performed (because a thread that did not own the lock attempted to unlock the associated object). The example process 350 then ends.

If, however, the current thread is the lock owner of the object (block 354), then the process 350 determines whether a lock recursion counter (or similar recursive locking indicator) associated with the lock is equal to zero (or, equivalently, indicates that the lock has only one acquire currently active) (block 362). If the lock recursion counter equals zero (block 362), the process 350 unlocks the lock of the object, for example, by setting the lock owner to a NULL value (block 366). If, however, the lock recursion counter is not equal to zero (block 362), the process 350 decrements the lock recursion counter (e.g., to indicate that the present lock release countered an active lock acquire) (block 370). After processing at blocks 366 or 370 completes, the example process 350 then ends.

Figure 4:
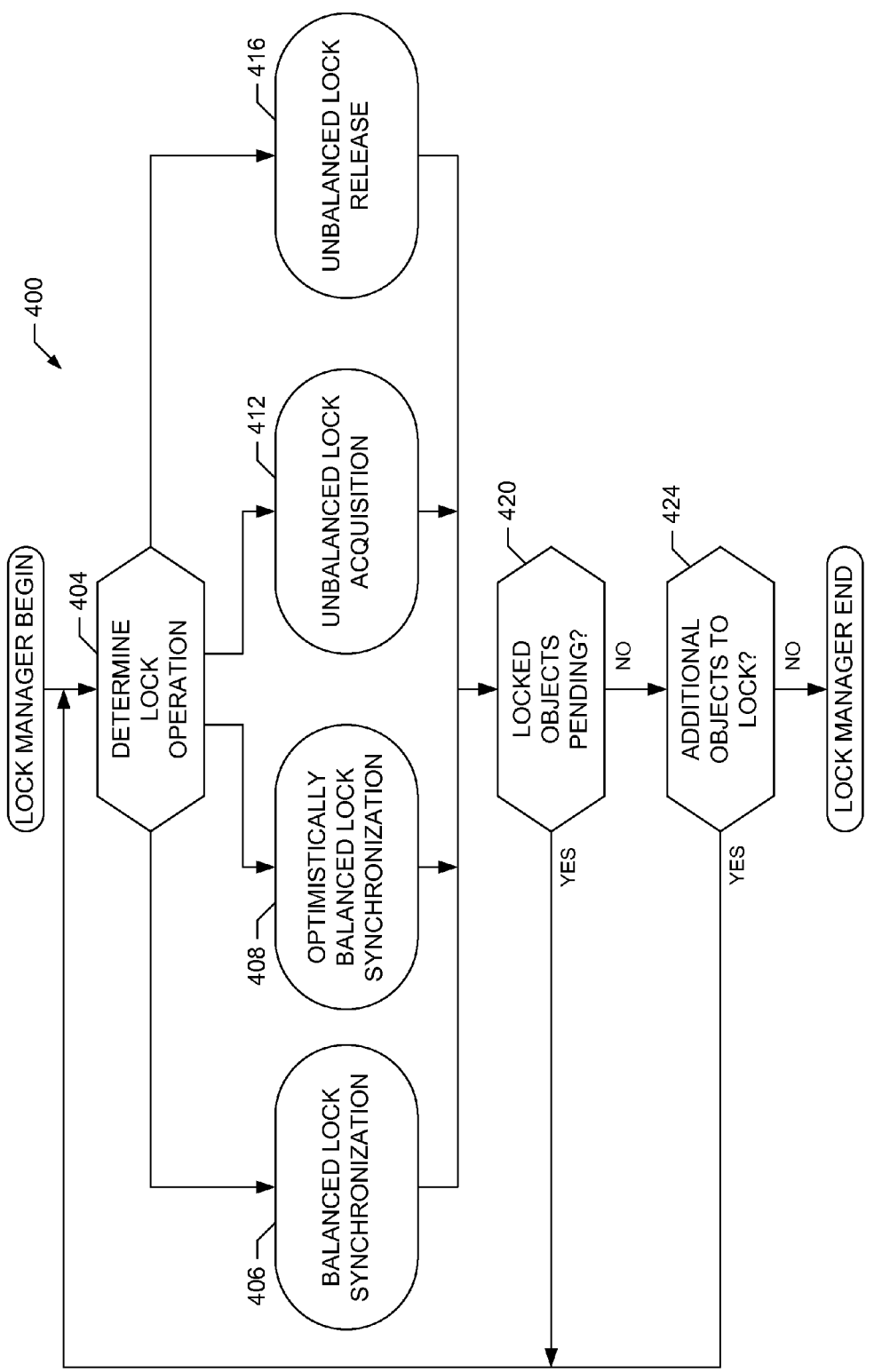
FIG. 4 is a flowchart representative of example machine readable instructions that may be executed by a machine to implement the example lock manager of FIG. 2.

Based on the understanding provided by the example prior-art processes 300 and 350 of FIGS. 3A-3B, an example lock manager process 400 that may be used to implement the example lock manager 200 of FIG. 2 is illustrated in FIG. 4. The example lock manager process 400 may be invoked, for example, during various execution stages of one or more threads when such threads operate on a synchronized object. For example, the example process 400 may be invoked to acquire or release a lock of an object.

The example lock manager process 400 begins by determining which type of locking operation to perform for the current thread on the lock of the object (block 404). Valid locking operations may include a balanced lock synchronization (comprising a balanced lock acquisition and release pair), an optimistically balanced lock synchronization (comprising an optimistically balanced lock acquisition and release pair), an unbalanced lock acquisition and an unbalanced lock release. For example, a JIT compiler, such as the JIT compiler 158 of FIG. 1, may use control flow graphs and/or data flow analyses to determine the types of locking operations to perform on the lock of an object at the appropriate points during program execution. The JIT compiler 158 may then output compiled code that may be used by the lock manager 200 or lock manager process 400 to make the appropriate lock operation determination at block 404. Any known technique for determining whether a locking operation is balanced, optimistically balanced or unbalanced may be employed by the example process 400 and, thus, such techniques are not discussed further herein.

Based on the locking procedure determination made at block 404, control then proceeds to one of blocks 406, 408, 412 and 416. At block 406, the lock manager 200 performs a balanced synchronization operation on the lock of the object. At block 408, the lock manager 200 performs an optimistically balanced synchronization operation on the lock of the object. At block 412, the lock manager 200 performs an unbalanced lock acquisition operation on the lock of the object. At block 416, the lock manager 200 performs an unbalanced lock release operation on the lock of the object. The processing performed at blocks 406, 408, 412 and 416 is discussed in greater detail through the descriptions of FIGS. 5A, 5B, 6 and 7, respectively, provided below.

After the processing at blocks 406, 408, 412 or 416 completes, the process 400 determines whether at least one locked object is still pending that will require a subsequent release at a future thread execution point (block 420). If any locked objects are pending (block 420), then control returns to block 404 and blocks subsequent thereto to allow the locks of such objects to be processed (as well as the locks of any additional objects to be locked). If, however, no locked objects are pending (block 420), the process 400 determines whether there are any additional objects to lock (block 424). If there are additional objects to lock (block 424), then control returns to block 404 and blocks subsequent thereto to allow the locks of such objects to be processed. If, however, there are no additional objects to lock (block 424), then the example process 400 ends. One having ordinary skill in the art will recognize that the conditional operations performed at blocks 420 and/or 424 may be replaced, for example, by an explicit or implicit determination regarding whether the program (or any thread of the program) is still executing. If the process 400 is still executing, control could then return to block 404 and subsequent blocks 406, 408, 412 and 416. Such a cycle could repeat until the process 400 (or all thread execution) terminates.

Figure 5A:
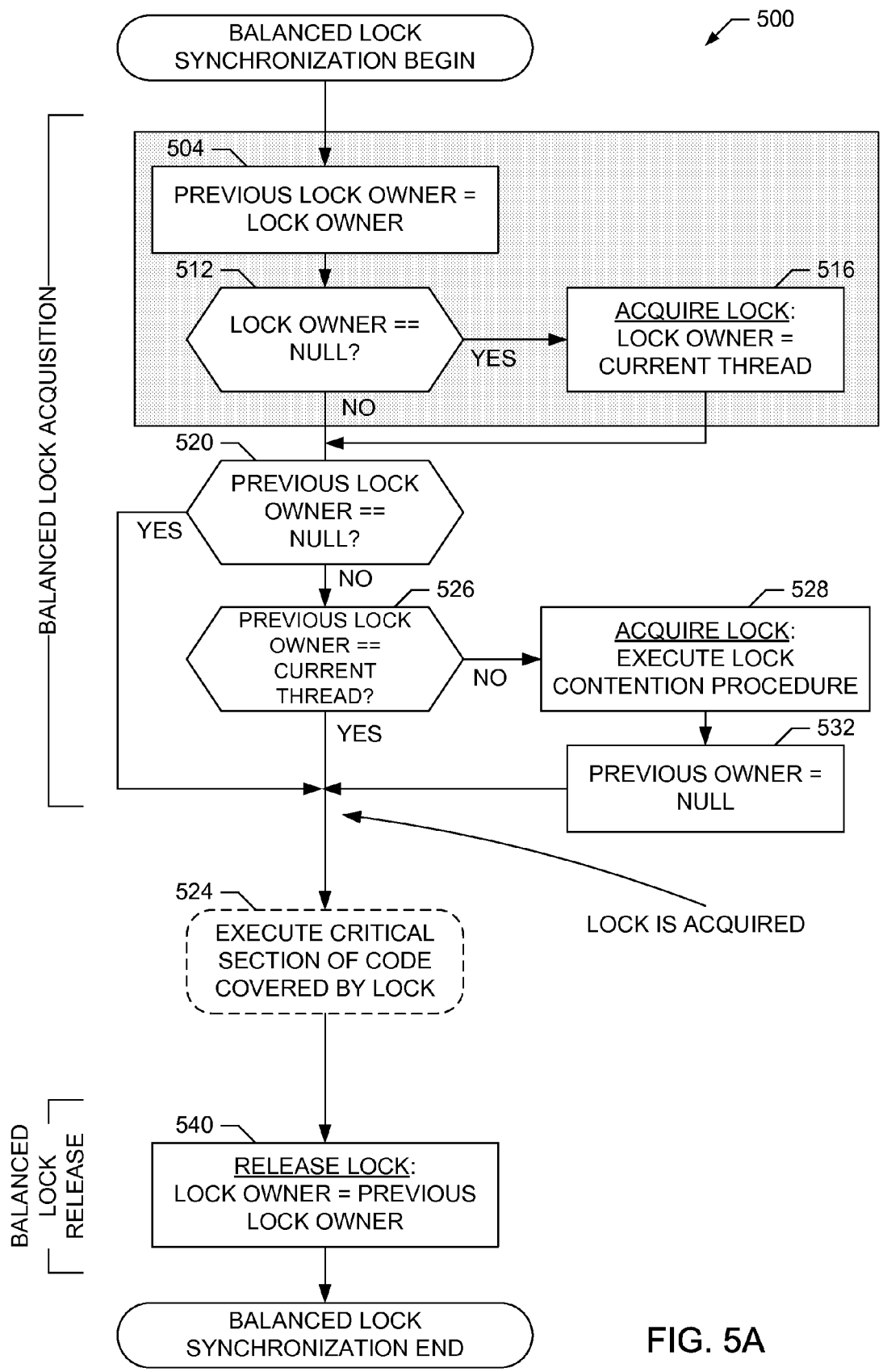
FIGS. 5A-5B are flowcharts representative of example machine readable instructions that may be executed by a machine to implement the example balanced lock synchronization unit and the example optimistically balanced lock synchronization unit, respectively, of FIG. 2.

An example balanced lock synchronization process 500 that may be used to perform the processing at block 406 of FIG. 4 and/or implement the balanced lock synchronization unit 218 of FIG. 2 is shown in FIG. 5A. The example balanced lock synchronization process 500 begins by setting a variable/register corresponding to the previous lock owner of the lock equal to the present lock owner (block 504). The process 500 then determines whether a thread already owns the lock of the object to be locked (i.e., whether a lock owner exists for the object or whether the lock owner is set to a NULL value) (block 512). If no thread owner exists (block 512) and, thus, the lock of the object is unlocked and the lock owner is set to a NULL value, then the process 500 acquires the lock of the object for the thread by setting the lock owner to a value representative of the thread (e.g., a unique thread identifier value) (block 516). If, however, the process 500 determines that a lock owner already exists (block 512), the process 500 leaves the lock owner unchanged.

To prevent a second thread from attempting to acquire the lock while a first thread is already in the process of becoming the lock owner, blocks 504, 512 and 516 are typically implemented using a single atomic operation (such as a cmpxchg instruction on a processor belonging to the Intel Itanium processor family). As discussed above, an atomic operation provides a thread (and/or a processor in a multi-processor system) with exclusive access to shared memory during the execution of the atomic operation. Thus, no other thread can modify the memory locations accessed by the atomic operation during its execution. For example, processing performed at blocks 504, 512 and 516 may be implemented on a processor belonging to the Intel Itanium processor family based on the following instruction sequence:

ar.ccv=mov 0
    r1=cmpxch2.acq [r3], r2

In the preceding instructions, the register r1 may be used to represent the previous lock owner, the register r2 may be used to represent the current thread, and the register r3 may hold an address corresponding to the present lock owner. The first instruction (ar.ccv=mov 0) sets the ar.ccv register to zero (i.e., a NULL value). The second instruction (r1=cmpxchg2.acq [r3], r2) is an atomic instruction that may be used to: 1) set the previous lock owner equal to the present lock owner (i.e., r1=[r3]); 2) check whether the present lock owner a NULL value (i.e., whether [r3] equals ar.ccv); 3) if the present lock owner is a NULL value (i.e., if [r3] equals ar.ccv), set the lock owner to a value representative of the current thread (i.e., [r3]=r2); and 4) if the present lock owner is not a NULL value (i.e., if [r3] does not equal ar.ccv), then leave the lock owner unchanged (i.e., leave [r3] unchanged).

Returning to FIG. 5A, after it is determined that either the lock owner is not NULL (block 512) or the lock owner is defined to be the current thread (block 516), the process 500 determines whether the previous lock owner of the object is a NULL value (corresponding to the case in which the current thread has acquired the lock at block 516) (block 520). If the previous lock owner is a NULL value (block 520), then control proceeds to block 524. If, however, the process 500 determines that the previous lock owner is not a NULL value (block 520), then the process determines whether the previous lock owner is the current thread (corresponding to the case in which the current thread has already previously acquired the lock) (block 526). If the previous lock owner is the current thread (block 526), then control proceeds to block 524. If, however, the process 500 determines that the previous lock owner is not the current thread (block 526) and, thus, that another thread already owns the lock, the process 500 invokes a known lock contention procedure to allow the current thread to acquire the lock after the present lock owner releases the lock (block 528). The known lock contention procedure should operate on the object lock such that the representation/format of the lock is not altered after the processing of block 528 completes. Additionally, the process 500 may cause the current thread to spin in an execution loop or halt execution until the present lock owner releases/unlocks the lock of the object. After the lock of the object becomes available, the process 500 may then acquire the lock for the current thread. Additionally, control proceeds to block 532 at which the process 500 resets the previous lock owner to a NULL value as there will be no previous lock owner after the lock contention procedure of block 528 completes. Control then proceeds to block 524.

At block 524, the current thread executes the critical section of code corresponding to the object that was locked. After the execution of this critical section of code completes, the process 500 resets the lock owner of the lock to be the previous lock owner (block 540). By resetting the lock owner equal to previous lock owner, the process 500 either unlocks the lock if the previous owner was a NULL value or maintains the lock for the current thread if the previous lock owner is the current thread. The example process 500 then ends.

Figure 5B:
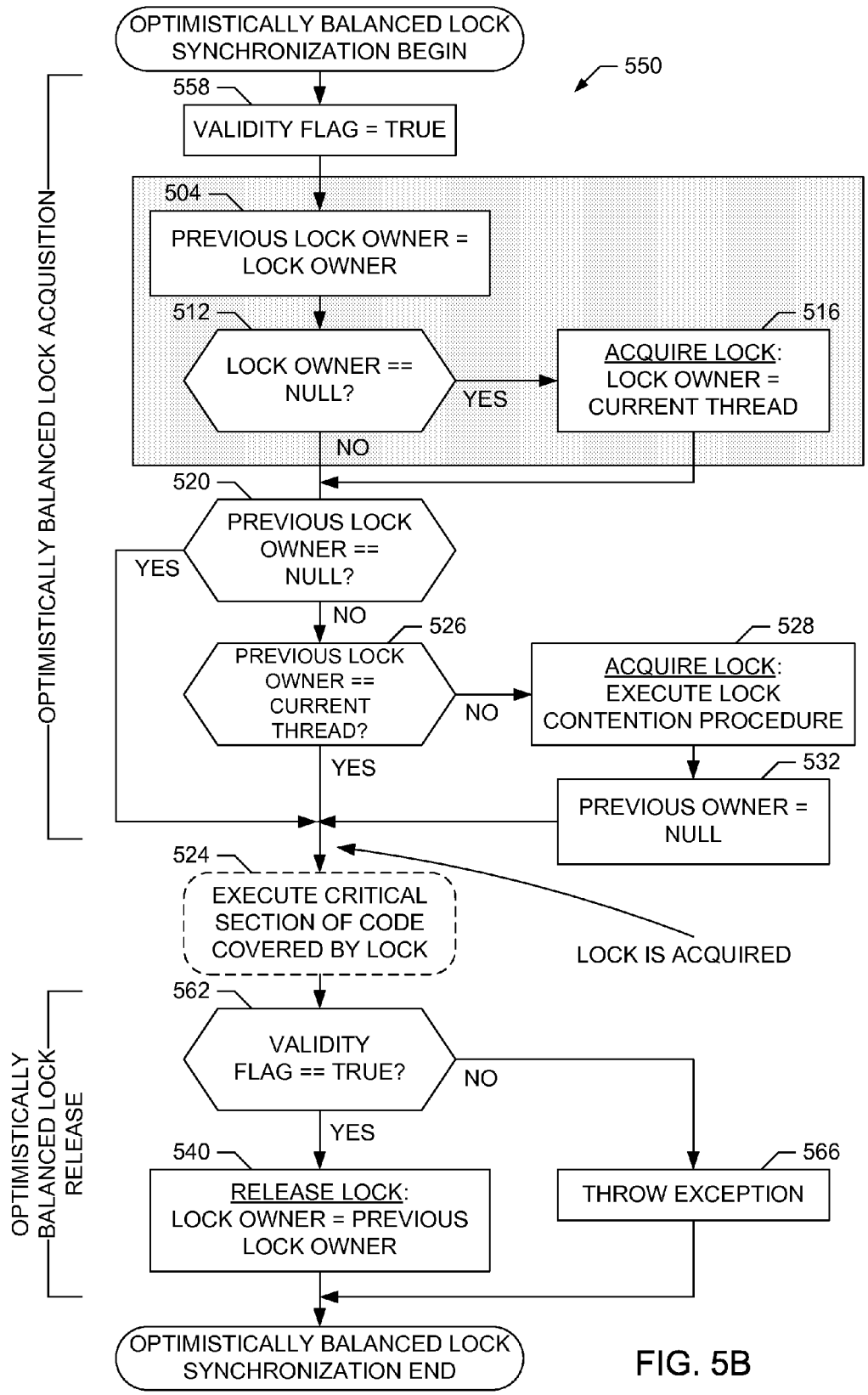

An example optimistically balanced lock synchronization process 550 that may be used to perform the processing performed at block 408 of FIG. 4 and/or implement the optimistically balanced lock synchronization unit 220 of FIG. 2 is shown in FIG. 5B. As there is significant overlap between the flowcharts of FIGS. 5A and 5B, blocks having substantially identical functionality are not re-described herein. Rather, the interested reader is referred to the corresponding blocks in FIG. 5A and their associated descriptions above. To assist the reader in this exercise, blocks having substantially similar functionality are labeled with identical reference numerals in FIGS. 5A and 5B.

The example optimistically balanced lock synchronization process 550 of FIG. 5B begins by initializing a validity flag to TRUE (block 558). As will become apparent below, this validity flag is used to indicate the validity state of a pending optimistically balanced lock release. Control then proceeds to block 504 and blocks subsequent thereto through which the process 550 acquires the lock for the current thread. Detailed descriptions of blocks 504, 512, 516, 520, 526, 528 and 532 are provided above as part of the detailed description of the example process 500 of FIG. 5A. After the process 550 acquires the lock for the current thread, control proceeds to block 524.

At block 524, the current thread executes the critical section of code that required the object to be locked. After the execution of this critical section of code completes, control proceeds to block 562 at which the process 550 attempts to release the most recent optimistically balanced lock acquisition of the lock of the object by first determining whether the validity flag of the corresponding pending optimistically release indicates that the release is valid. If the validity flag is TRUE (block 562) and, thus, the pending optimistically balanced release corresponds to unlocking or maintaining the lock (in the case of recursive locking), the process 550 resets the lock owner of the lock to be the previous lock owner (block 540). If, however, the validity flag is FALSE (block 562) and, thus, corresponds to an invalid optimistically balanced release, the process 550 throws an exception using any known exception handling technique (block 566). Then, after the processing at blocks 540 or 566 completes, the example process 550 ends.

To support recursive optimistically balanced lock synchronization (and also the unbalanced lock acquisition and release procedures discussed below), the lock manager 200 and/or the lock manager process 400 utilizes one or more synchronization maps to track pending optimistically balanced synchronization operations for each instance of a method (e.g., JAVA method) that invokes an optimistically balanced lock synchronization. An example synchronization map may include a lock address, a previous lock owner value and a validity flag for each optimistically balanced synchronization operation in the method. Additionally, the synchronization map may include the address range corresponding to the critical section of code that required the object to be locked. Each entry of the synchronization map may be stored in the call stack within the call frame corresponding to the particular instance of the method that caused the optimistically balanced lock synchronization (thereby supporting recursive lock acquisition caused by nested calls to the same method). As is discussed in greater detail below, the unbalanced lock acquisition and release operations may traverse the synchronization map to determine the number and type of optimistically balanced synchronization operations (and, specifically, the optimistically balanced release operations) that are pending on the call stack and modify such operations as needed.

Figure 6A:
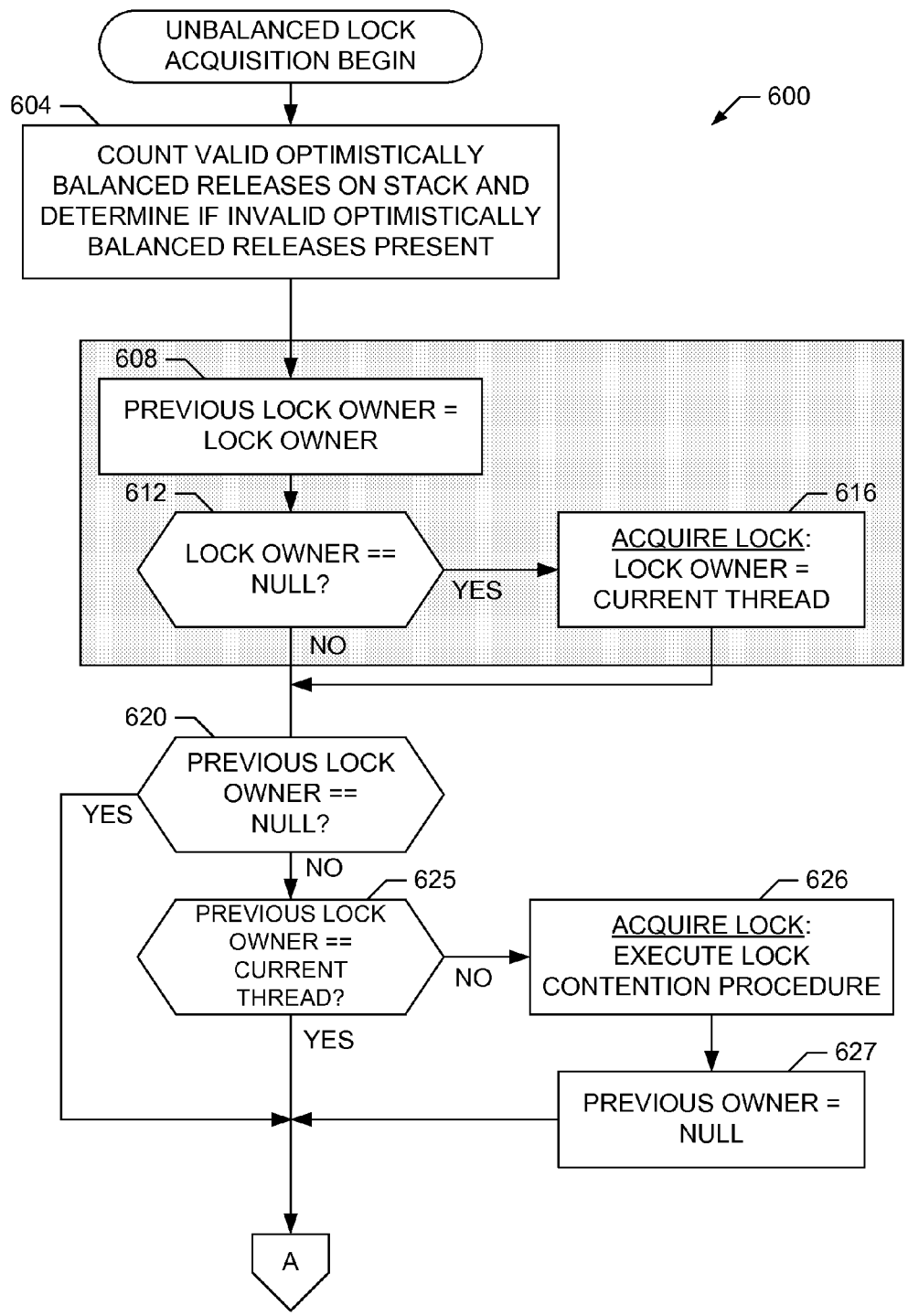
FIGS. 6A-6B are a flowchart representative of example machine readable instructions that may be executed by a machine to implement the example unbalanced lock acquisition unit of FIG. 2.
Figure 6B:
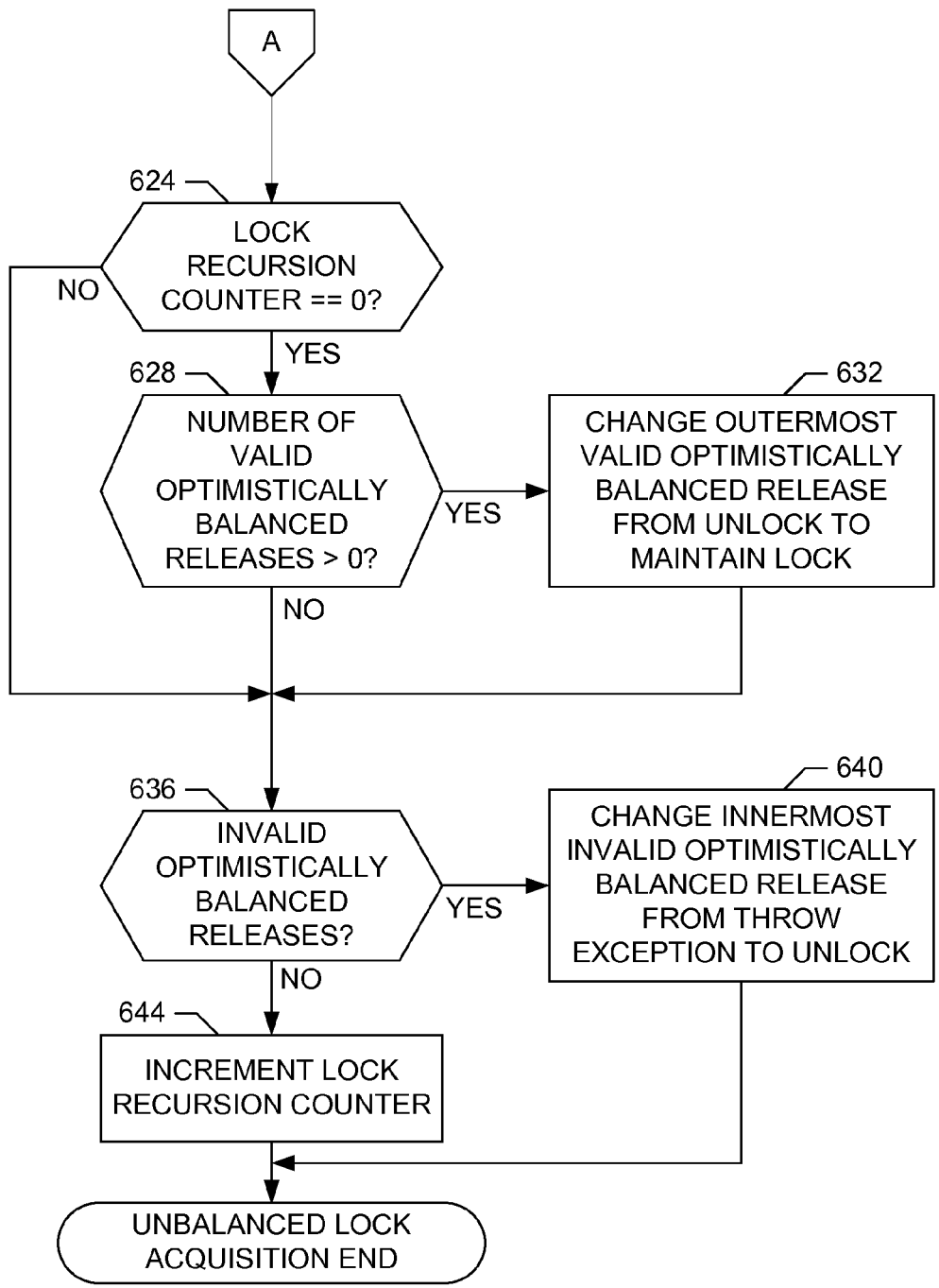
Figure 8:
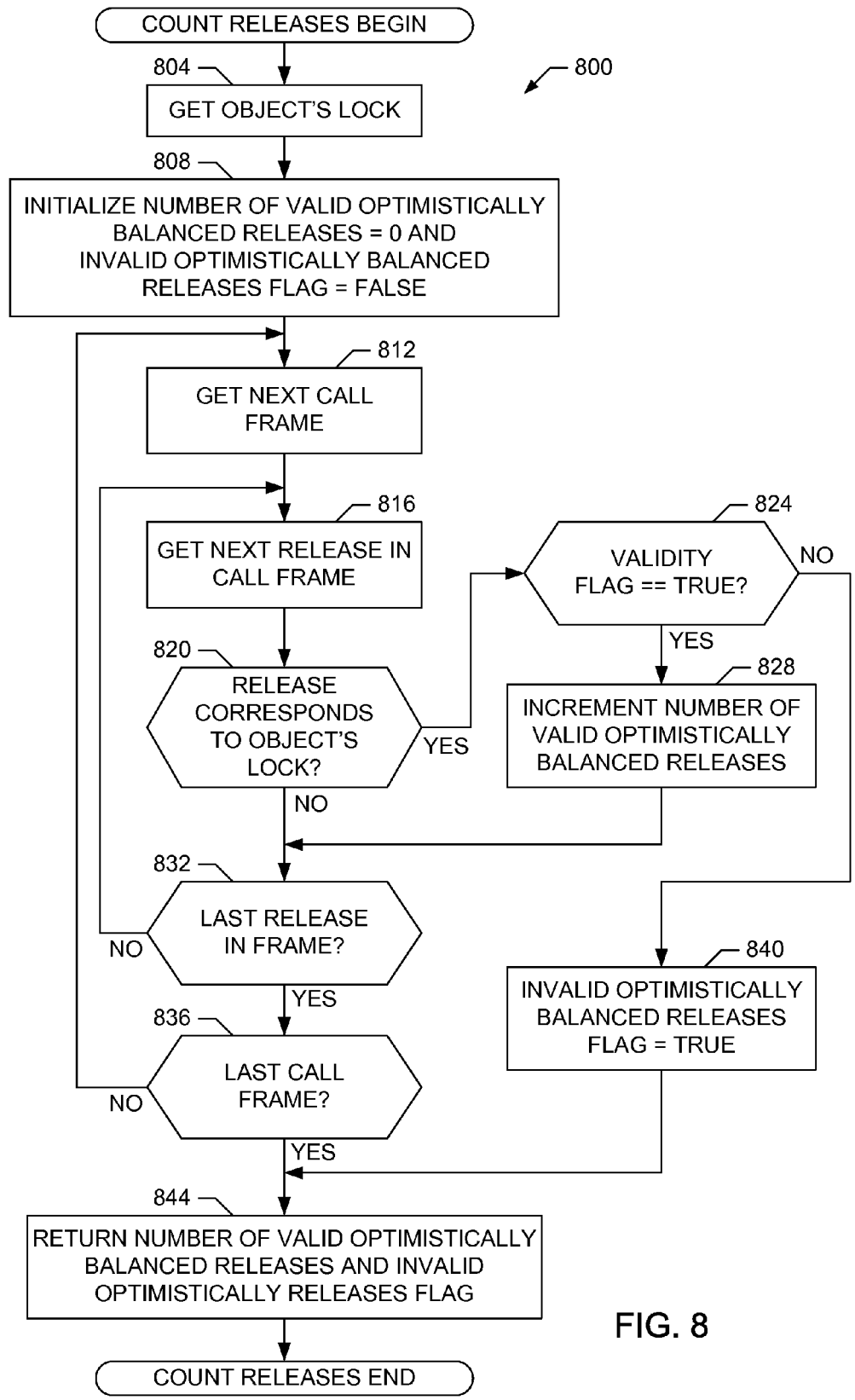
FIG. 8 is a flowchart representative of example machine readable instructions that may be executed by a machine to determine the state of pending balanced releases for use by the processes of FIGS. 6A-6B and 7.

An example unbalanced lock acquisition process 600 that may be used to perform the processing at block 412 of FIG. 4 and/or implement the unbalanced lock acquisition unit 224 of FIG. 2 is shown in FIGS. 6A-6B. The example unbalanced lock acquisition process 600 begins by traversing the synchronization map maintained, for example, by the example optimistically balanced lock synchronization process 550 of FIG. 5B or the optimistically balanced lock synchronization unit 220 of FIG. 2 to count the number of pending valid optimistically balanced releases and determine if any invalid optimistically balanced releases are pending (block 604 of FIG. 6A). An example procedure for implementing the processing performed at block 604 is shown in FIG. 8 and is discussed in greater detail below.

After processing at block 604 completes, the process 600 sets a variable/register corresponding to the previous lock owner of the lock equal to the present lock owner (block 608). The process 600 then determines whether a thread already owns the lock of the object to be locked (i.e., whether a lock owner exists for the object or whether the lock owner is set to a NULL value) (block 612). If no thread owner exists (block 612) and, thus, the lock of the object is unlocked and the lock owner is set to a NULL value, then the process 600 acquires the lock of the object for the thread by setting the lock owner to a value representative of the thread (e.g., a unique thread identifier value) (block 616). If, however, the process 600 determines that a lock owner already exists (block 612), the process 600 leaves the lock owner unchanged.

As discussed previously, to prevent a second thread from attempting to acquire the lock while a first thread is already in the process of becoming the lock owner, blocks 608, 612 and 616 are typically implemented using a single atomic operation (such as a cmpxchg instruction on a processor belonging to the Intel processor family). An atomic operation provides a thread (and/or a processor in a multi-processor system) with exclusive access to shared memory during the execution of the atomic operation. Thus, no other thread can modify the memory locations accessed by the atomic operation during its execution.

Returning to FIG. 6A, after it is determined that either the lock owner is not NULL (block 612) or the lock owner is defined to be the current thread (block 616), the process 600 determines whether the previous lock owner of the object is a NULL value (corresponding to the case in which the current thread has acquired the lock at block 616) (block 620). If the previous lock owner is a NULL value (block 620), then control proceeds to block 624 of FIG. 6B. If, however, the process 600 determines that the previous lock owner is not a NULL value (block 620), then the process determines whether the previous lock owner is the current thread (corresponding to the case in which the current thread has already previously acquired the lock) (block 625). If the previous lock owner is the current thread (block 625), then control proceeds to block 624 of FIG. 6B. If, however, the process 600 determines that the previous lock owner is not the current thread (block 625) and, thus, that another thread already owns the lock, the process 600 invokes a known lock contention procedure to allow the current thread to acquire the lock after the present lock owner releases the lock (block 626). The known lock contention procedure should operate on the object lock such that the representation/format of the lock is not altered after the processing of block 626 completes. Additionally, the process 600 may cause the current thread to spin in an execution loop or halt execution until the present lock owner releases/unlocks the lock of the object. After the lock of the object becomes available, the process 600 may then acquire the lock for the current thread. Additionally, control proceeds to block 627 at which the process 600 reset the previous lock owner to a NULL value as there will be no previous lock owner after the lock contention procedure of block 626 completes. Control then proceeds to block 624 of FIG. 6B.

Figure 9:
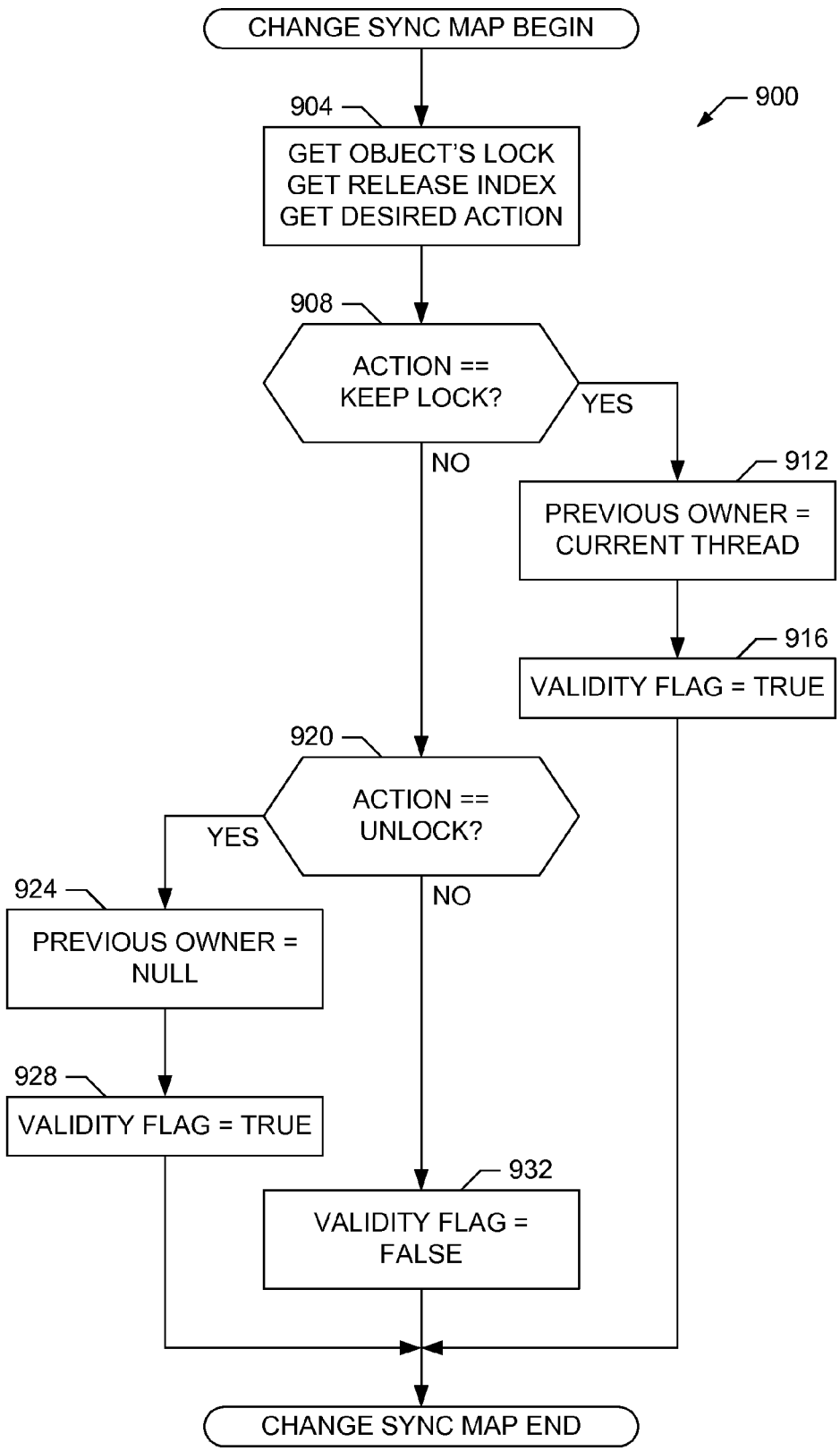
FIG. 9 is a flowchart representative of example machine readable instructions that may be executed by a machine to modify the state of pending balanced releases for use by the processes of FIGS. 6A-6B and 7.

At block 624 of FIG. 6B, the process 600 determines whether a lock recursion counter is set equal to zero. The lock recursion counter (or similar indicator) may be used to indicate the number of active unbalanced lock acquisitions that are not offset by unbalanced lock releases. If the lock recursion counter equals zero (block 624) and, thus, there are no other active unbalanced lock acquisitions, the process 600 determines whether a non-zero number of pending valid optimistically balanced releases was returned by the processing performed at block 604 (block 628). If the number of pending valid optimistically balanced releases is not zero (block 628) and, thus, there is at least one pending valid optimistically balanced release, the process 600 modifies the state of the outermost (i.e., oldest) pending valid optimistically balanced release from an unlock operation to a maintain lock operation (block 632). This modification is required because the additional unbalanced lock acquisition will cause there to be a remaining active lock acquisition when the last pending optimistically balanced lock release is performed. Thus, the process 600 must now cause the lock to be maintained to correspond with the remaining active lock acquisition. An example procedure for implementing the processing performed at block 632 is shown in FIG. 9 and is discussed in greater detail below.

If the lock recursion counter is not zero (block 624) and, thus, other unbalanced lock acquisitions are active, or if there are no valid optimistically balanced releases in the synchronization map (block 628), or if processing at block 632 completes, control then proceeds to block 636. At block 636, the process 600 determines whether the presence of any pending invalid optimistically balanced releases was indicated by the processing performed at block 604. If any invalid optimistically balanced releases are pending (block 636), the process 600 modifies the state of the innermost (i.e., most recent) pending invalid optimistically balanced release from a throw exception operation to an unlock lock operation (block 640). Invalid optimistically balanced releases will always occur after all pending valid optimistically balanced releases have been executed. Thus, this modification is required because the additional unbalanced lock acquisition will offset the first invalid optimistically balanced lock release. Thus, the process 600 must now cause the lock to be unlocked for this first invalid optimistically balanced release to correspond with the additional active lock acquisition. An example procedure for implementing the processing performed at block 640 is shown in FIG. 9 and is discussed in greater detail below.

If, however, there are no pending invalid optimistically balanced releases (block 636), the process 600 increments the lock recursion counter to indicate an unbalanced lock acquisition has been performed (and is therefore active) and that it is not offset by a preceding unbalanced lock release (block 644). (If a preceding unbalanced release had been performed, then there would have been at least one pending invalid optimistically balanced release and control would have proceeded to block 640.) After processing at blocks 640 or 644 completes, the example process of FIG. 6 ends.

Figure 7:
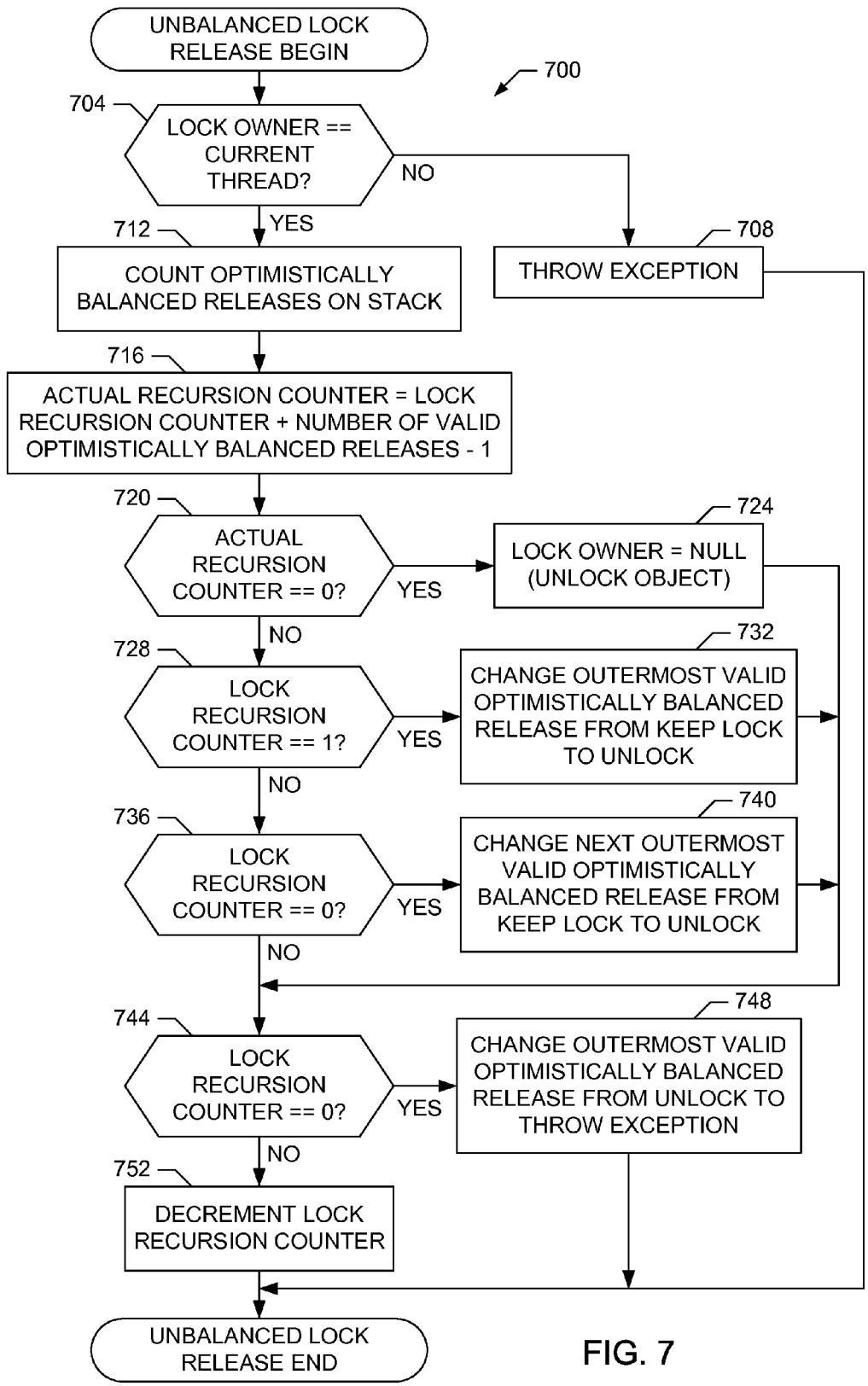
FIG. 7 is a flowchart representative of example machine readable instructions that may be executed by a machine to implement the example unbalanced lock release unit of FIG. 2.

An example unbalanced lock release process 700 that may be used to perform the processing at block 416 of FIG. 4 and/or implement the unbalanced lock release unit 228 of FIG. 2 is shown in FIG. 7. The example unbalanced lock release process 700 begins by determining whether the current thread is the lock owner of the object to be released (block 704). If the current thread is not the lock owner (block 704), the process 700 may use any known exception handling technique to throw an exception indicating that the thread improperly attempted to release a lock that it did not own (block 708). The example process 700 then ends.

If, however, the current thread is the lock owner (block 704), then at least one optimistically balanced lock synchronization or unbalanced lock acquisition was performed on the lock of the object. Thus, the process 700 traverses the synchronization map maintained, for example, by the example optimistically balanced lock synchronization process 550 of FIG. 5A or the optimistically balanced lock synchronization unit 220 of FIG. 2 to count the number of pending valid optimistically balanced releases (block 712). An example procedure for implementing the processing performed at block 712 is shown in FIG. 8 and is discussed in greater detail below. The process 700 then determines an actual recursion counter (corresponding to a value one less than the total number of optimistically balanced and unbalanced acquisitions still active on the lock) by summing the number of pending valid optimistically balanced releases returned at block 712 (which corresponds to the number of active optimistically balanced lock acquisitions) and a lock recursion counter (e.g., updated by the example unbalanced lock acquisition process 600 of FIGS. 6A-6B to indicate the number of active unbalanced lock acquisitions not offset by unbalanced lock releases) and then subtracting one (block 716).

Next, the process 700 determines whether the actual recursion counter equals zero and, therefore, there is only one active optimistically balanced acquisition or one active unbalanced acquisition (block 720). Thus, if the actual recursion counter equals zero (block 720), the process 700 unlocks the lock of the object as a result of performing the unbalanced release operation after a single active lock acquisition (block 724). If, however, the actual recursion counter is greater than zero (block 720), the process 700 determines whether the lock recursion counter equals one (block 728). If the lock recursion counter equals one, then there is one active unbalanced lock acquisition and at least one active optimistically balanced lock acquisition (and the corresponding valid optimistically balanced release(s)). Thus, if the lock recursion counter equals one, the process 700 modifies the state of the outermost (i.e., oldest) pending valid optimistically balanced release from a maintain lock operation to an unlock operation (block 732). This modification is required because the unbalanced lock release counters the unbalanced lock acquisition that previously caused the modification of the outermost pending valid optimistically balanced lock to correspond to a maintain lock state. Thus, the process 700 must cause the outermost pending valid optimistically balanced release to be returned back to its original unlock state. An example procedure for implementing the processing performed at block 732 is shown in FIG. 9 and is discussed in greater detail below.

If, however, the lock recursion counter is not equal to one (block 728), the process 700 determines whether the lock recursion counter equals zero (block 736). If the lock recursion counter equals zero (block 736), then there are at least two pending valid optimistically balanced releases (because the actual recursion counter was determined to be greater than zero at block 720). Thus, if the recursion counter equals zero, the process 700 modifies the state of the next outermost (i.e., second oldest) pending valid optimistically balanced release from a maintain lock operation to an unlock operation (block 740). This modification is required because the unbalanced lock release will cause there to be an extra lock release that will unlock the lock of the object after all active lock acquisitions have been countered. Thus, the process 700 must change the next outermost pending valid optimistically balanced release to an unlock state because at that point all active acquisitions would be countered by releases. An example procedure for implementing the processing performed at block 740 is shown in FIG. 9 and is discussed in greater detail below.

After processing at blocks 724, 732 or 740 completes, control proceeds to block 744 at which the process 700 determines whether the lock recursion counter equals zero. If the lock recursion counter equals zero (block 744), then there is at least one pending valid optimistically balanced release. Thus, if the lock recursion counter equals zero, the process 700 modifies the state of the outermost (i.e., oldest) pending valid optimistically balanced release from an unlock operation to a throw exception operation. This modification is required because the extra unbalanced lock release will cause there to be one additional release after all active acquisitions have been countered. Thus, the process 700 must change the outermost pending valid optimistically balanced release to a throw exception state because at that point all active acquisitions would be countered by releases and then another release would be performed by a thread that is not the lock owner of the object. An example procedure for implementing the processing performed at block 748 is shown in FIG. 9 and is discussed in greater detail below.

If, however, the lock recursion counter is greater than zero (block 744), then the process 700 decrements the lock recursion counter to indicate that one of the active unbalanced lock acquisitions has been countered by the unbalanced lock release (block 752). After processing at blocks 748 or 752 completes, the example process 700 then ends.

An example process 800 for counting the number of pending valid optimistically balanced releases in a synchronization map (e.g., the synchronization map maintained by the optimistically balanced lock synchronization process 550 of FIG. 5A or the optimistically balanced lock synchronization unit 220 of FIG. 2) and determining if any invalid optimistically balanced releases are pending is shown in FIG. 8. The example process 800 may be used by, for example, the example unbalanced lock acquisition process 600 and/or the unbalanced lock release process 700 of FIGS. 6 and 7, respectively. Specifically, the example process 800 may be invoked by the example processes 600 and/or 700 to implement the processing performed by block 604 of FIG. 6, and/or 712 of FIG. 7. The example process 800 may also be used to implement the optimistically balanced release tracker 232 of FIG. 2.

Turning to FIG. 8, the example process 800 begins by obtaining the lock corresponding to the object being processed, for example, by obtaining the address of the lockword associated with the object (block 804). The process 800 then initializes a counter corresponding to the number of pending valid optimistically balanced releases to zero and initializes a flag corresponding to the presence of any pending invalid optimistically balanced releases to FALSE (block 808). After this initialization completes, the process 800 begins iterating through each call frame in the call stack to determine the presence of optimistically balanced releases corresponding to the object lock selected at block 804.

The process 800 begins iterating through the call frame of the call stack by obtaining the next call frame on the call stack (block 812). The process 800 then obtains the next pending optimistically balanced release stored in the call frame being processed (block 816). Next, the process 800 determines whether the pending optimistically balanced release corresponds to the object lock being processed (block 820). If the pending optimistically balanced release does correspond to the object lock being processed (block 820), the process 800 determines whether the validity flag corresponding to the pending optimistically balanced release being processed is set to TRUE (block 824). If the validity flag is TRUE (block 824), the process 800 increments the counter corresponding to the number of pending valid optimistically balanced releases (block 828).

After the processing at block 828 completes, or if the optimistically balanced release does not correspond to the object lock being processed (block 820), the process 800 determines whether the optimistically balanced release being processed is the last release in call frame being processed (block 832). If the optimistically balanced release is not the last release (block 832), control then returns to block 816 at which the process 800 obtains the next optimistically balanced release in the call frame to process. If, however, the optimistically balanced release is the last release (block 832), the process 800 determines whether the call frame being processed is the last call frame in the call stack (and thus whether the end of the synchronization map has been reached) (block 836). If the call frame is not the last call frame (block 836), then control returns to block 812 at which the process 800 gets the next call frame to process.

If at block 824 the validity flag for the optimistically balanced release being processed is determined to be FALSE, then the process 800 breaks the control flow that is iterating through each call frame of the call stack and branches to block 840. At block 840, the process 800 sets the flag corresponding to the presence of any pending invalid optimistically balanced releases to FALSE. Then, after processing at block 840 completes, or if the call frame being processed is the last call frame in the call stack (block 836), the process 800 returns the number of pending valid optimistically balanced releases and a flag indicating the presence or absence of any pending invalid optimistically balanced releases. The example process 800 then ends.

An example process 900 to modify the state of a pending optimistically balanced release in a synchronization map (e.g., the synchronization map maintained by the optimistically balanced lock synchronization process 550 of FIG. 5A or the optimistically balanced lock synchronization unit 220 of FIG. 2) is shown in FIG. 9. The example process 900 may be used by, for example, the example unbalanced lock acquisition process 600 and/or the unbalanced lock release process 700 of FIGS. 6 and 7, respectively. Specifically, the example process 900 may be invoked by the example processes 600 and/or 700 to implement the processing performed by any or all of the blocks 632 and 634 of FIGS. 6, and 732, 740 and 748 of FIG. 7. The example process 900 may also be used to implement the optimistically balanced synchronization state modifier 236 of FIG. 2.

Turning to FIG. 9, the example process 900 begins by obtaining the lock corresponding to the object being processed, for example, by obtaining the address of the lockword associated with the object (block 904). The process 900 also obtains an index to a pending optimistically balanced release in the synchronization map to process and the action to be performed on the indexed release (block 904). The object lock, pending optimistically balanced release index and desired action may be provided, for example, by a calling process that invoked the example process 900. Control then proceeds to block 908 at which the process 900 begins performing the desired action on the indexed optimistically balanced release corresponding to the object lock.

At block 908, the process 900 determines whether the desired action corresponds to a maintain lock state of the indexed balanced release. If the desired action corresponds to a maintain lock state (block 908), the process 900 sets the previous lock owner of the indexed optimistically balanced release equal to the current thread (block 912). Thus, when the indexed optimistically balanced release executes, the lock owner will be set to the previous lock owner, which will still be the current thread, thereby maintaining the lock. The process 900 also sets the validity flag of the indexed optimistically balanced release to TRUE (block 916) and the example process 900 ends.

If at block 908 the desired action does not correspond to a maintain lock state, the process 900 determines whether the desired action corresponds to an unlock state of the indexed optimistically balanced release (block 920). If the desired action corresponds to an unlock state (block 920), the process 900 sets the previous lock owner of the indexed optimistically balanced release equal to a NULL value (indicating no thread owner) (block 924). Thus, when the indexed balanced release executes, the lock owner will be set to the previous lock owner, which will be a NULL value, thereby unlocking the lock. The process 900 also sets the validity flag of the indexed optimistically balanced release to TRUE (block 928) and the example process 900 ends.

If at block 920 the desired action does not correspond to the unlock state (and also does not correspond to the maintain lock state based on processing at block 908), then the process 900 sets the validity flag of the indexed optimistically balanced release to FALSE (block 932) because the desired action corresponds to a throw exception state. The example process 900 then ends.

Figure 10A:
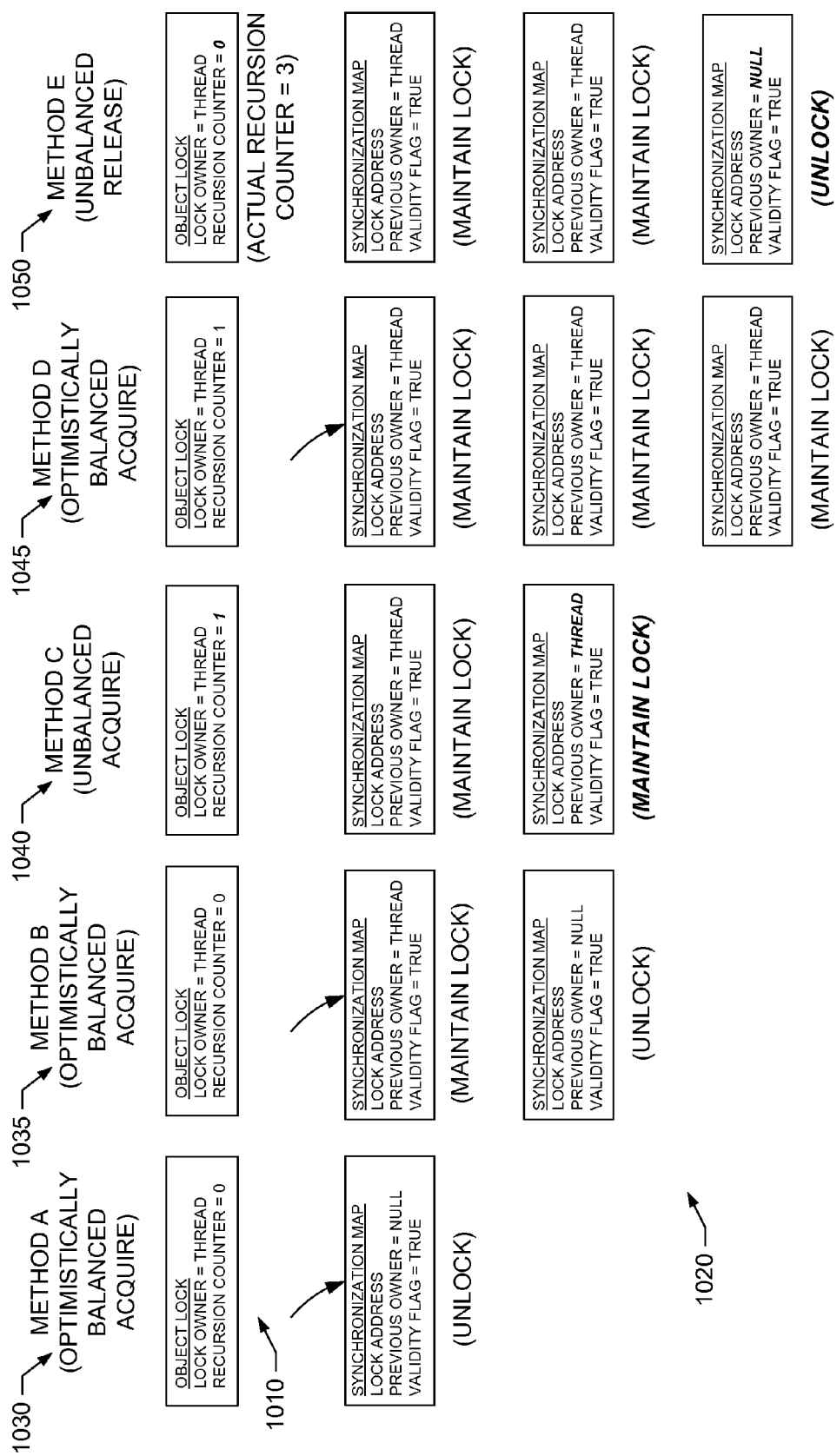
FIGS. 10A-10B illustrate an example operation of the lock manager of FIG. 2.
Figure 10B:
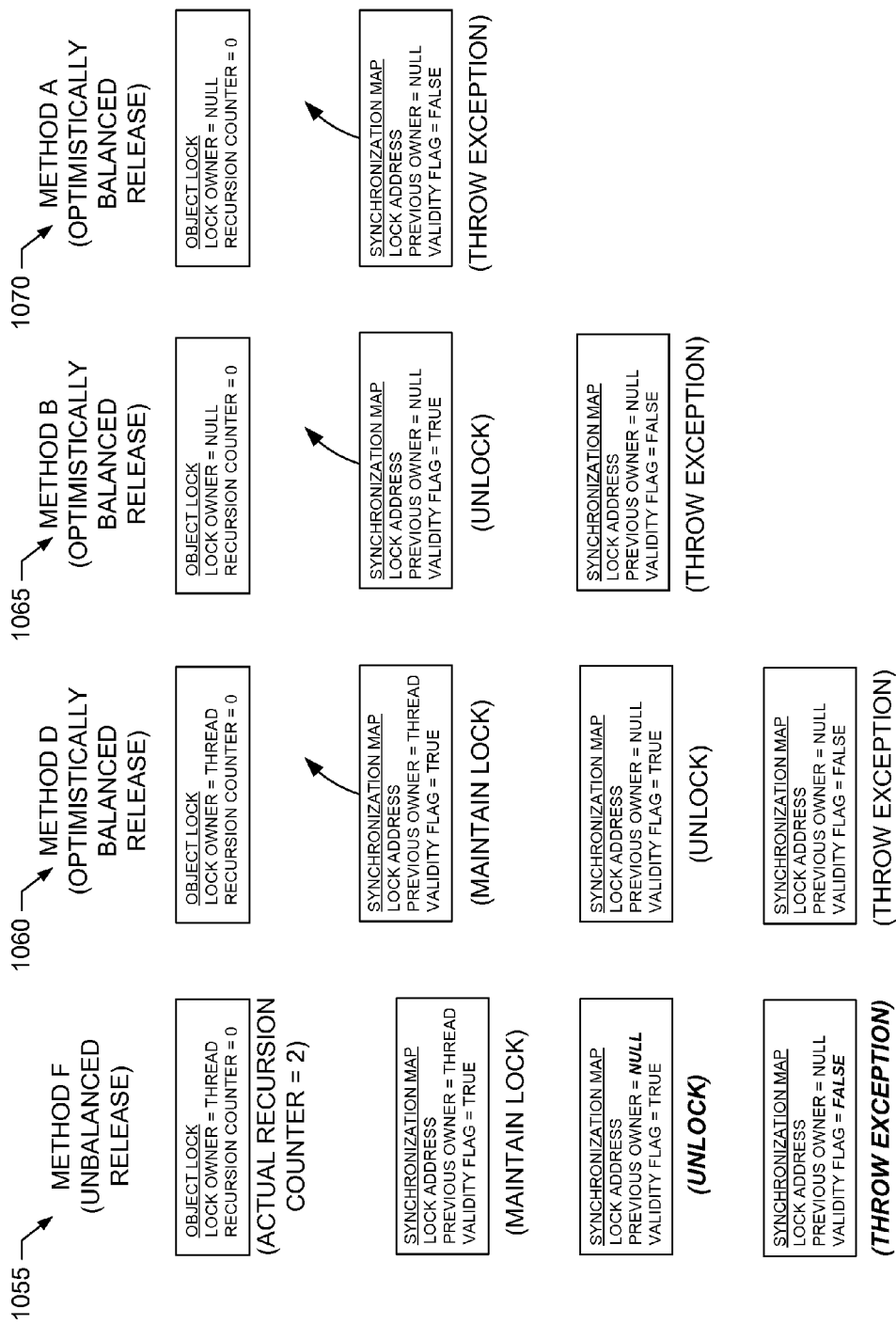

To assist in understanding the methods, apparatus and articles of manufacture described herein, an example operation of the example lock manager of FIG. 2 and/or the example processes 500, 550, 600, 700, 800 and 900 of FIGS. 5A, 5B, 6A-6B, 7, 8 and 9, respectively, is shown in FIGS. 10A-10B. The example operation of FIGS. 10A-10B corresponds to a sequence of lock acquisitions and releases performed on a lock of a single object by a single thread. The locking sequence results from various methods A through F being invoked that require that the object be locked for method execution. At each stage in the locking sequence, FIGS. 10A-10B illustrate the state of the object lock 1010 and the contents of the synchronization map 1020 at the completion of the corresponding locking operation. The object lock 1010 includes a lock owner and a lock recursion counter. Each entry of the synchronization map 1020 includes a previous lock owner and a validity flag, along with other possible information.

The example operation begins at stage 1030 of FIG. 10A with the object being unlocked (i.e., corresponding to a lock owner equal to a NULL value and a recursion counter equal to zero) and method A causing an optimistically balanced lock synchronization to be performed on the lock. According to the example process 550, the object lock is updated to assign the lock owner to the current thread and the recursion counter remains zero. The synchronization map includes one entry corresponding to the first optimistically balanced release and having a previous owner equal to a NULL value and a validity flag equal to TRUE (i.e., corresponding to an unlock state).

Next, at stage 1035 method B causes another optimistically balanced lock synchronization to be performed on the lock of the object (corresponding to a recursive locking scenario). According to the example process 550, the state of the object lock remains unchanged and another entry is added to the synchronization map corresponding to this second optimistically balanced release. The previous owner of the lock for this new entry is set equal to a value representative of the thread (because the lock is already owned by the thread) and the validity flag is set to TRUE (i.e., corresponding to a maintain lock state).

Next, at stage 1040 method C causes an unbalanced lock acquisition to be performed on the object lock. According to the example process 600, the lock recursion counter is incremented to a value of one. Additionally, the outermost pending valid optimistically balanced release is modified from an unlock state to a maintain lock state by setting the previous lock owner to a value representative of the current thread and setting the validity flag to TRUE.

Next, at stage 1045 method D causes another optimistically balanced lock synchronization to be performed on the lock of the object (corresponding to a recursive locking scenario). According to the example process 550, the state of the object lock remains unchanged and another entry is added to the synchronization map corresponding to this third optimistically balanced release. The previous owner of the lock for this new entry is set equal to a value representative of the thread (because the lock is already owned by the thread) and the validity flag is set to TRUE (i.e., corresponding to a maintain lock state).

Next, at stage 1050 method E causes an unbalanced lock release to be performed on the object lock. According to the example process 700, the actual recursion counter is determined to have a value of three (corresponding to three pending valid optimistically balanced releases and a recursion counter equal to one). Thus, the outermost pending valid optimistically balanced release is modified from a maintain lock state to an unlock state by setting the previous lock owner to a NULL value and setting the validity flag to TRUE. Additionally, the lock recursion counter is decremented to a value of zero.

Next, at stage 1055 of FIG. 10B method F causes another unbalanced lock release to be performed on the object lock. According to the example process 700, the actual recursion counter is determined to have a value of two (corresponding to three pending valid optimistically balanced releases and a recursion counter equal to zero). Thus, the next outermost pending valid optimistically balanced release is modified from a maintain lock state to an unlock state by setting the previous lock owner to a NULL value and setting the validity flag to TRUE. Additionally, the outermost pending valid optimistically balanced release is modified from an unlock state to a throw exception state by setting the validity flag to FALSE.

Next, at block 1060 the critical section of method D completes execution causing the innermost of three pending optimistically balanced releases to be processed. The optimistically balanced release process begins with the lock owned by the current thread as shown in FIG. 10B. Then, according to example process 550, the innermost optimistically pending balanced release having a maintain lock state is processed.

Next, at block 1065 the critical section of method B completes execution causing the innermost of two pending optimistically balanced releases to be processed. As a result of processing the previous balanced release at stage 1060, the object lock is still owned by the current thread. Then, according to example process 550, the innermost pending balanced release having an unlock state is processed.

Finally, at block 1070 the critical section of method A completes execution causing the remaining pending optimistically balanced release to be processed. As a result of processing the previous balanced release at stage 1065, the object lock is not owned (e.g., is set to a NULL value). Then, according to example process 550, the remaining pending balanced release having a throw exception state is processed, thereby causing an exception to be thrown.

Figure 11:
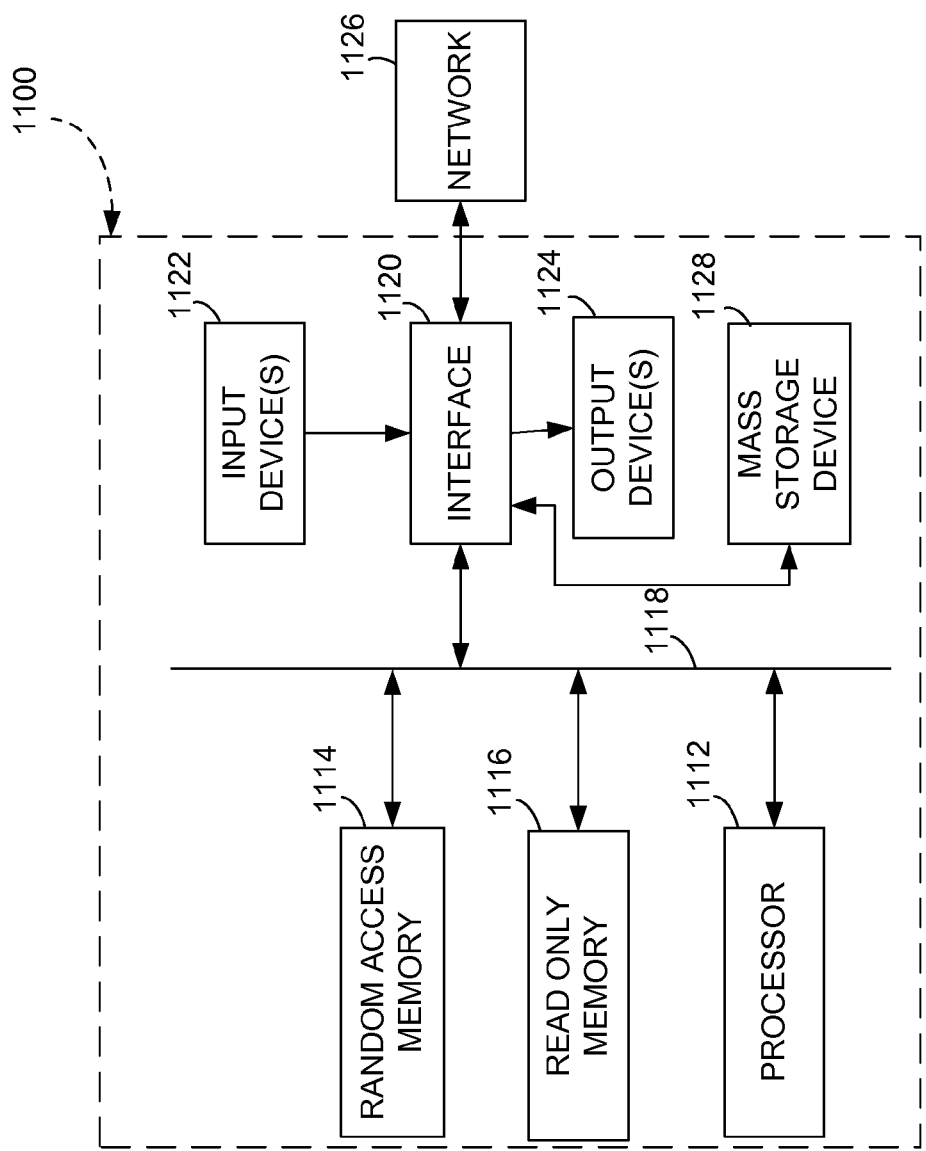
FIG. 11 is a schematic illustration of an example processor system that may carry out the processes of FIGS. 4-9 to implement the lock manager of FIG. 2.

FIG. 11 is a block diagram of an example computer or processor system 1100 capable of implementing the apparatus and methods disclosed herein. The computer 1100 can be, for example, a server, a personal computer, a personal digital assistant (PDA), an Internet appliance, or any other type of computing device.

The system 1100 of the instant example includes a processor 1112. For example, the processor 1112 can be implemented by one or more Intel® microprocessors from the Pentium® family, the Itanium® family or the XScale® family. Of course, other processors from other families are also appropriate. A processor 1112 including one or more microprocessors may be used to implement the example environment of use 100 of FIG. 1, the example lock manager 200 of FIG. 2 and/or the example processes 500, 550, 600, 700, 800 and 900 of FIGS. 5A, 5B, 6A-6B, 7, 8 and 9, respectively.

The processor 1112 is in communication with a main memory including a volatile memory 1114 and a non-volatile memory 1116 via a bus 1118. The volatile memory 1114 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is typically controlled by a memory controller (not shown) in a conventional manner.

The computer 1100 also includes a conventional interface circuit 1120. The interface circuit 1120 may be implemented by any type of well known interface standard, such as an Ethernet interface, a universal serial bus (USB), and/or a third generation input/output (3 GIO) interface.

One or more input devices 1122 are connected to the interface circuit 1120. The input device(s) 1122 permit a user to enter data and commands into the processor 1112. The input device(s) can be implemented by, for example, a keyboard, a mouse, a touchscreen, a track-pad, a trackball, an isopoint and/or a voice recognition system.

One or more output devices 1124 are also connected to the interface circuit 1120. The output devices 1124 can be implemented, for example, by display devices (e.g., a liquid crystal display, a cathode ray tube display (CRT)), by a printer and/or by speakers. The interface circuit 1120, thus, typically includes a graphics driver card.

The interface circuit 1120 also includes a communication device such as a modem or network interface card to facilitate exchange of data with external computers via a network 1126 (e.g., an Ethernet connection, a digital subscriber line (DSL), a telephone line, coaxial cable, a cellular telephone system, etc.).

The computer 1100 also includes one or more mass storage devices 1128 for storing software and data. Examples of such mass storage devices 1128 include floppy disk drives, hard drive disks, compact disk drives and digital versatile disk (DVD) drives. The mass storage device 1128 and/or the volatile memory 1114 may be used to store, for example, the synchronization map maintained and modified by processes 500, 550, 600 and 700 of FIGS. 5A, 5B, 6A-6B and 7, respectively.

As an alternative to implementing the methods and/or apparatus described herein in a system such as the device of FIG. 11, the methods and or apparatus described herein may alternatively be embedded in a structure such as a processor and/or an ASIC (application specific integrated circuit).

From the foregoing, persons of ordinary skill in the art will appreciate that the above disclosed methods and apparatus may be implemented in a static compiler, a managed run-time environment just-in-time (JIT) compiler, and/or directly in the hardware of a microprocessor to achieve performance optimization in executing various programs.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to perform optimistically balanced synchronization in a managed run-time environment, the method comprising:
    initiating a first optimistically balanced synchronization to acquire a lock of an object, the first optimistically balanced synchronization comprising a first optimistically balanced acquisition and a first optimistically balanced release to be performed on the lock by a same thread and at a same nesting level;
    releasing the lock after execution of program code covered by the lock if a stored state of the first optimistically balanced release indicates that the first optimistically balanced release is still valid, the stored state of the first optimistically balanced release being initialized prior to execution of the program code to indicate that the first optimistically balanced release is valid; and
    throwing an exception after execution of the program code covered by the lock if the stored state of the first optimistically balanced release indicates that the first optimistically balanced release is no longer valid, wherein the stored state of the first optimistically balanced release is used to manage subsequent, recursive optimistically balanced synchronizations of the lock without updating a recursion counter associated with the lock.

2. A method as defined in claim 1 further comprising storing the state of the first optimistically balanced release while the first optimistically balanced synchronization is pending, the stored state of the first optimistically balanced release identifying a previous owner of the lock and including a validity indicator to indicate whether the first optimistically balanced release is valid.

3. A method as defined in claim 2 wherein releasing the lock comprises setting an owner of the lock to be the previous owner of the lock.

4. A method as defined in claim 1 further comprising modifying the stored state of the first optimistically balanced release when a subsequent unpaired locking operation is performed on the lock.

5. A method as defined in claim 4 wherein the stored state of the first optimistically balanced release remains unchanged when a subsequent optimistically balanced synchronization is performed to recursively acquire the lock.

6. A method as defined in claim 4 wherein modifying the stored state of the first optimistically balanced release comprises, when the subsequent unpaired locking operation comprises an unpaired lock release operation and the first optimistically balanced release corresponds to an oldest pending optimistically balanced release to be performed on the lock, modifying a validity indicator included in the stored state of the first optimistically balanced release to indicate that the first optimistically balanced release is not valid.

7. A tangible machine readable storage medium comprising machine readable instructions which, when executed, cause a machine to at least:
    initiate a first optimistically balanced synchronization to acquire a lock of an object, the first optimistically balanced synchronization comprising a first optimistically balanced acquisition and a first optimistically balanced release to be performed on the lock by a same thread and at a same nesting level;
    release the lock after execution of program code covered by the lock if a stored state of the first optimistically balanced release indicates that the first optimistically balanced release is still valid, the stored state of the first optimistically balanced release being initialized prior to execution of the program code to indicate that the first optimistically balanced release is valid; and
    throw an exception after execution of the program code covered by the lock if the stored state of the first optimistically balanced release indicates that the first optimistically balanced release is no longer valid, wherein the stored state of the first optimistically balanced release is used to manage subsequent, recursive optimistically balanced synchronizations of the lock without updating a recursion counter associated with the lock.

8. A storage medium as defined in claim 7 wherein the machine readable instructions, when executed, further cause the machine to store the state of the first optimistically balanced release while the first optimistically balanced synchronization is pending, the stored state of the first optimistically balanced release identifying a previous owner of the lock and including a validity indicator to indicate whether the first optimistically balanced release is valid.

9. A storage medium as defined in claim 8 wherein to release the lock, the machine readable instructions, when executed, cause the machine to set an owner of the lock to be the previous owner of the lock.

10. A storage medium as defined in claim 7 wherein the machine readable instructions, when executed, further cause the machine to modify the stored state of the first optimistically balanced release when a subsequent unpaired locking operation is performed on the lock.

11. A storage medium as defined in claim 10 wherein the stored state of the first optimistically balanced release remains unchanged when a subsequent optimistically balanced synchronization is performed to recursively acquire the lock.

12. A storage medium as defined in claim 10 wherein, when the subsequent unpaired locking operation comprises an unpaired lock release operation and the first optimistically balanced release corresponds to an oldest pending optimistically balanced release to be performed on the lock, the machine readable instructions, when executed, cause the machine to modify a validity indicator included in the stored state of the first optimistically balanced release to indicate that the first optimistically balanced release is not valid.

13. An apparatus to perform optimistically balanced synchronization in a managed run-time environment, the apparatus comprising:
    a processor to:
        initiate a first optimistically balanced synchronization to acquire a lock of an object, the first optimistically balanced synchronization comprising a first optimistically balanced acquisition and a first optimistically balanced release to be performed on the lock by a same thread and at a same nesting level;
        release the lock after execution of program code covered by the lock if a stored state of the first optimistically balanced release indicates that the first optimistically balanced release is still valid, the stored state of the first optimistically balanced release being initialized prior to execution of the program code to indicate that the first optimistically balanced release is valid; and throw an exception after execution of the program code covered by the lock if the stored state of the first optimistically balanced release indicates that the first optimistically balanced release is no longer valid; and a memory to store the state of the first optimistically balanced release, wherein the stored state of the first optimistically balanced release is used to manage subsequent, recursive optimistically balanced synchronizations of the lock without updating a recursion counter associated with the lock.

14. An apparatus as defined in claim 13 wherein the processor further is to store the state of the first optimistically balanced release in the memory while the first optimistically balanced synchronization is pending, the stored state of the first optimistically balanced release identifying a previous owner of the lock and including a validity indicator to indicate whether the first optimistically balanced release is valid.

15. An apparatus as defined in claim 14 wherein to release the lock, the processor is to set an owner of the lock to be the previous owner of the lock.

16. An apparatus as defined in claim 13 wherein the processor further is to modify the stored state of the first optimistically balanced release when a subsequent unpaired locking operation is performed on the lock, the stored state of the first optimistically balanced release to remain unchanged when a subsequent optimistically balanced synchronization is performed to recursively acquire the lock.

17. An apparatus as defined in claim 16 wherein, when the subsequent unpaired locking operation comprises an unpaired lock release operation and the first optimistically balanced release corresponds to an oldest pending optimistically balanced release to be performed on the lock, the processor is to modify a validity indicator included in the stored state of the first optimistically balanced release to indicate that the first optimistically balanced release is not valid.

* * * * *